United States Patent
Dögel et al.

(10) Patent No.: US 10,125,844 B2
(45) Date of Patent: Nov. 13, 2018

(54) TORSIONAL VIBRATION DAMPER ASSEMBLY

(71) Applicant: ZF FRIEDRICHSHAFEN AG, Friedrichshafen (DE)

(72) Inventors: Thomas Dögel, Nüdlingen (DE); Uwe Grossgebauer, Erlabrunn (DE); Andreas Orlamünder, Schonungen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 303 days.

(21) Appl. No.: 14/436,847

(22) PCT Filed: Oct. 14, 2013

(86) PCT No.: PCT/EP2013/071424
§ 371 (c)(1),
(2) Date: Apr. 17, 2015

(87) PCT Pub. No.: WO2014/060353
PCT Pub. Date: Apr. 24, 2014

(65) Prior Publication Data
US 2015/0316123 A1    Nov. 5, 2015

(30) Foreign Application Priority Data
Oct. 17, 2012 (DE) .......... 10 2012 218 921

(51) Int. Cl.
*F16C 15/00* (2006.01)
*F16F 15/131* (2006.01)
(Continued)

(52) U.S. Cl.
CPC .......... *F16F 15/13128* (2013.01); *F16D 3/12* (2013.01); *F16F 15/1336* (2013.01);
(Continued)

(58) Field of Classification Search
CPC ............. F16F 15/13128; F16F 15/1336; F16F 15/1421; F16D 3/12; F16D 3/50
See application file for complete search history.

(56) References Cited

U.S. PATENT DOCUMENTS

| | | | |
|---|---|---|---|
| RE27,996 E * | 4/1974 | Wiseman ................. | F16D 3/50 464/27 |
| 5,188,002 A | 2/1993 | Wolf et al. | |
| | | (Continued) | |

FOREIGN PATENT DOCUMENTS

| | | | |
|---|---|---|---|
| DE | 30 23 300 | | 2/1981 |
| DE | 3641962 | * | 7/1988 |
| | (Continued) | | |

OTHER PUBLICATIONS

Define exactly—Google Search, google.com., May 17, 2017.*
(Continued)

*Primary Examiner* — Vinh Luong
(74) *Attorney, Agent, or Firm* — Cozen O'Connor

(57) ABSTRACT

A torsional vibration damping arrangement for a drivetrain of a vehicle, having a carrier arrangement which is rotatable around an axis of rotation, a deflection mass movable in circumferential direction relative to the carrier arrangement, carrier arrangement and the deflection mass are coupled to be rotatable relative to one another via restoring elements arranged in circumferential direction that extend from the deflection mass in direction of the carrier arrangement. A restoring element is deformable around a force application point which is movable in radial direction under centrifugal force and which is associated with the restoring element. The movable force application point is acted upon by a preloading force acting radially in direction of the axis of
(Continued)

rotation by a preloading spring. A main axis of the preloading spring and a main axis of the restoring element do not extend coaxially.

23 Claims, 16 Drawing Sheets

(51) Int. Cl.
*F16F 15/133* (2006.01)
*F16D 3/12* (2006.01)
*F16H 45/02* (2006.01)
*F16F 15/14* (2006.01)
*F16F 15/12* (2006.01)

(52) U.S. Cl.
CPC ......... *F16F 15/1421* (2013.01); *F16H 45/02* (2013.01); *F16F 15/1202* (2013.01); *F16H 2045/021* (2013.01); *F16H 2045/0226* (2013.01); *F16H 2045/0284* (2013.01); *Y10T 74/2121* (2015.01)

(56) References Cited

U.S. PATENT DOCUMENTS

| | | | | |
|---|---|---|---|---|
| 5,775,472 | A * | 7/1998 | Osterberg | F16F 7/10 188/378 |
| 6,634,472 | B1 * | 10/2003 | Davis | F16F 7/10 188/378 |
| 9,556,928 | B2 * | 1/2017 | Grossgebauer | F16F 15/1421 |
| 9,599,188 | B2 * | 3/2017 | Dogel | F16F 15/1202 |
| 9,964,176 | B2 * | 5/2018 | Dogel | F16F 15/1428 |
| 2009/0221376 | A1 * | 9/2009 | Movlazada | F16F 15/12306 464/180 |
| 2015/0247551 | A1 * | 9/2015 | Lorenz | F16F 15/13128 464/68.1 |
| 2016/0169321 | A1 * | 6/2016 | Dogel | F16F 15/1428 74/574.2 |

FOREIGN PATENT DOCUMENTS

| | | | |
|---|---|---|---|
| DE | 38 25 258 | 2/1990 | |
| DE | 19812303 A1 * | 9/1999 | ........ F16F 15/12306 |
| DE | 199 19 458 | 3/2000 | |
| DE | 10 297 771 | 8/2005 | |
| DE | 10 2009 032 340 A1 * | 4/2010 | ............. F16F 15/14 |
| DE | 10 2010 049 553 | 5/2011 | |
| DE | 10 2010 053 542 | 6/2011 | |
| DE | 10 2012 205 793 | 12/2012 | |
| FR | 2828543 A1 * | 2/2003 | |
| GB | 2156477 A * | 10/1985 | |
| WO | WO 2012/016955 | 2/2012 | |
| WO | WO 2012/168026 | 12/2012 | |

OTHER PUBLICATIONS

Define instance—Google Search, google.com, May 17, 2017.*
EPO Machine Translation of DE 102010053542 A1, Reder, Jun. 16, 2011.*
EPO Machine Translation of FR 2828543 (A1), Gino et al., Feb. 2003.*
EPO Machine Translation of DE 19812303 (A1), Kundermann, Sep. 1999.*
English Abstract of DE 3641962, Mueller, Jul. 1988.*

* cited by examiner

-PRIOR ART-

-PRIOR ART-

-PRIOR ART-

-PRIOR ARTa) b)

-PRIOR ART-

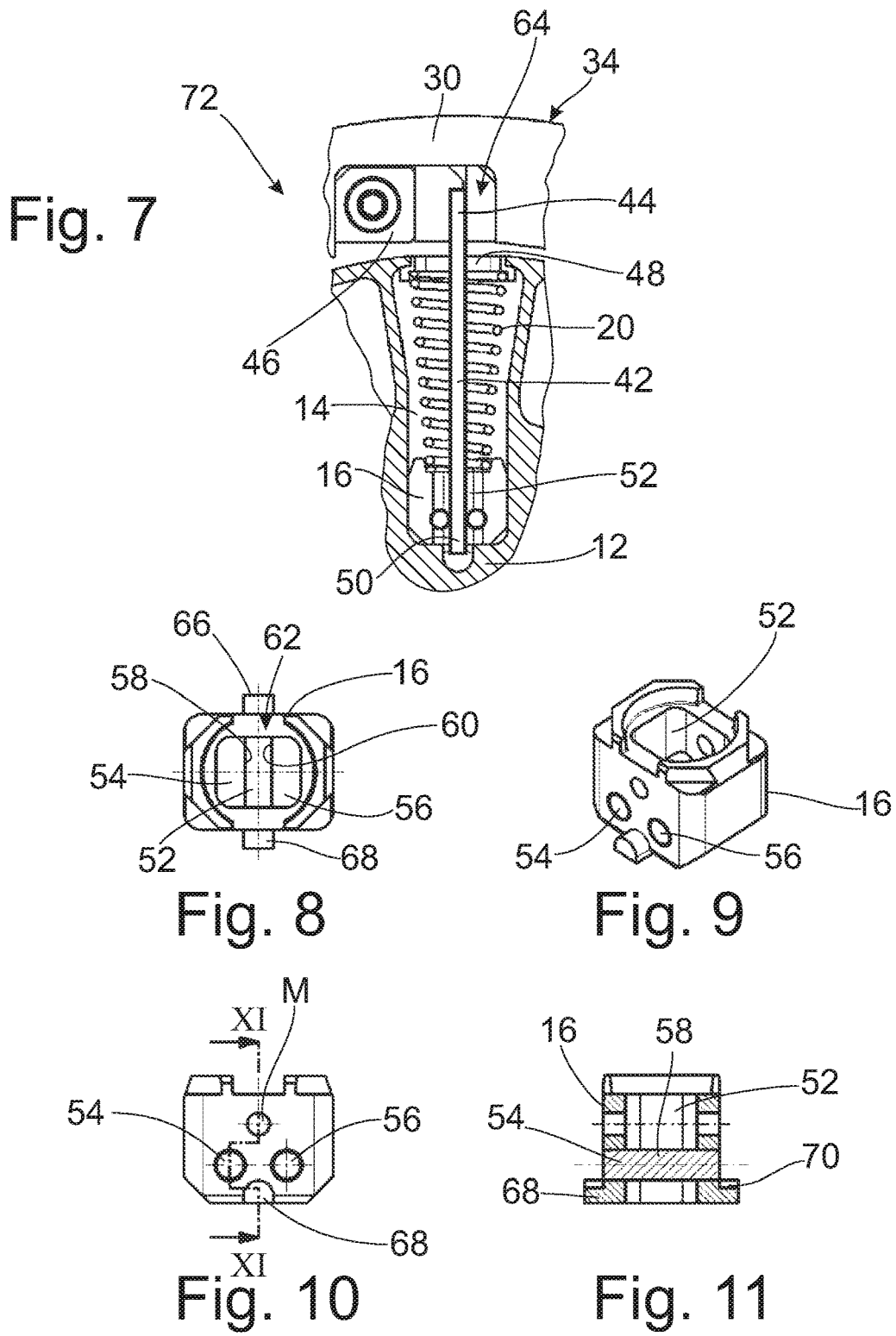
-PRIOR ART-

Fig. 12a
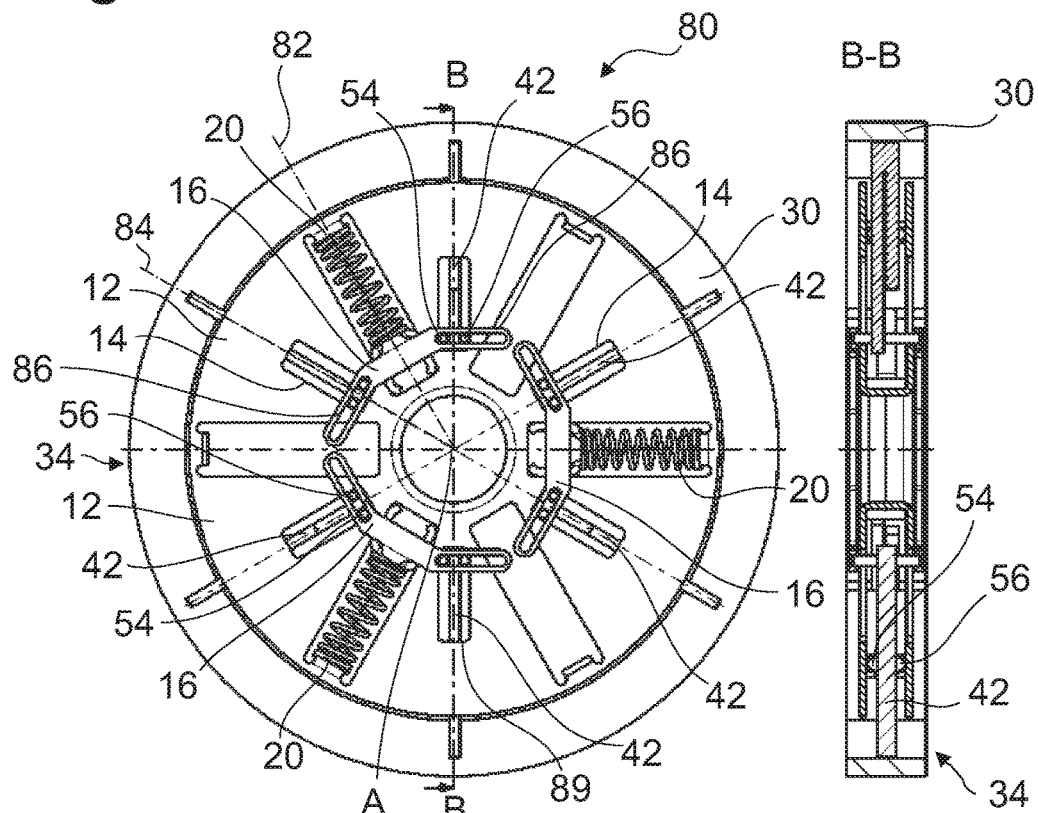
Fig. 12b
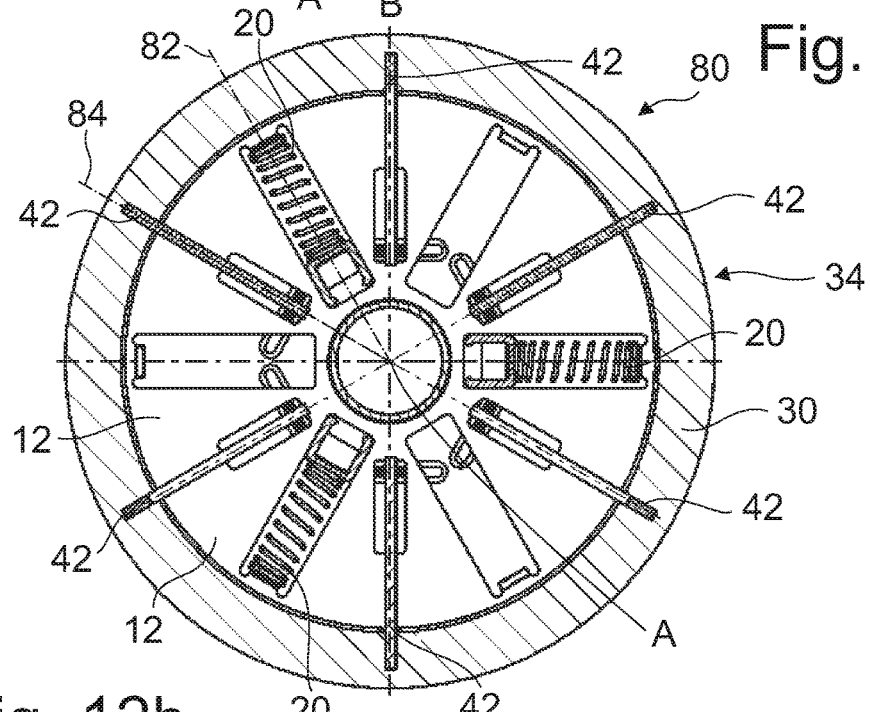
Fig. 12c

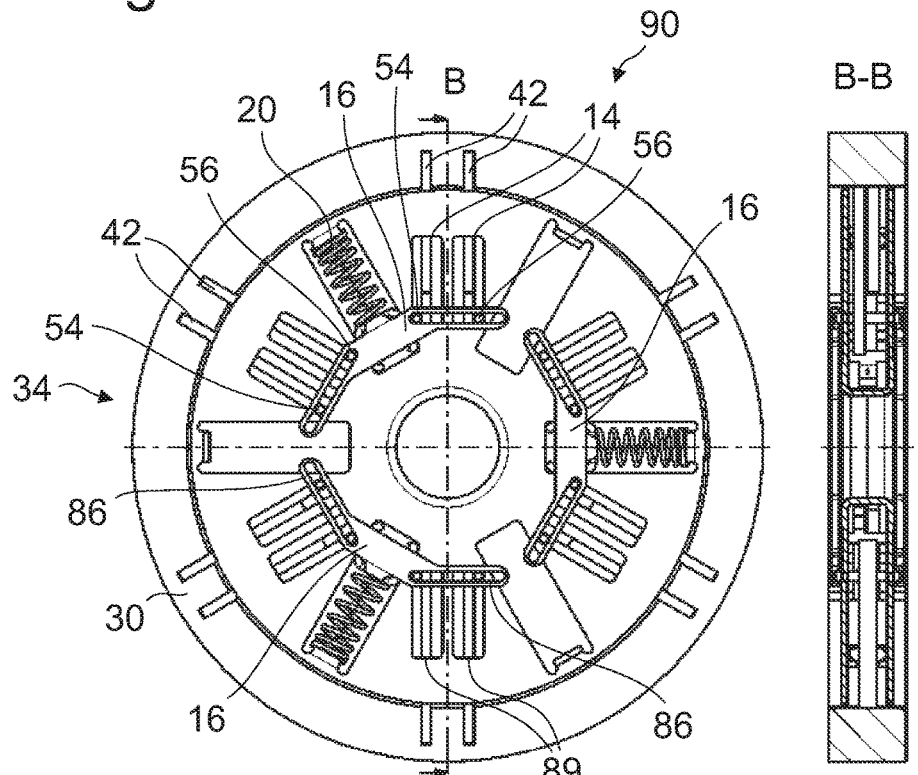
Fig. 14a
Fig. 14c
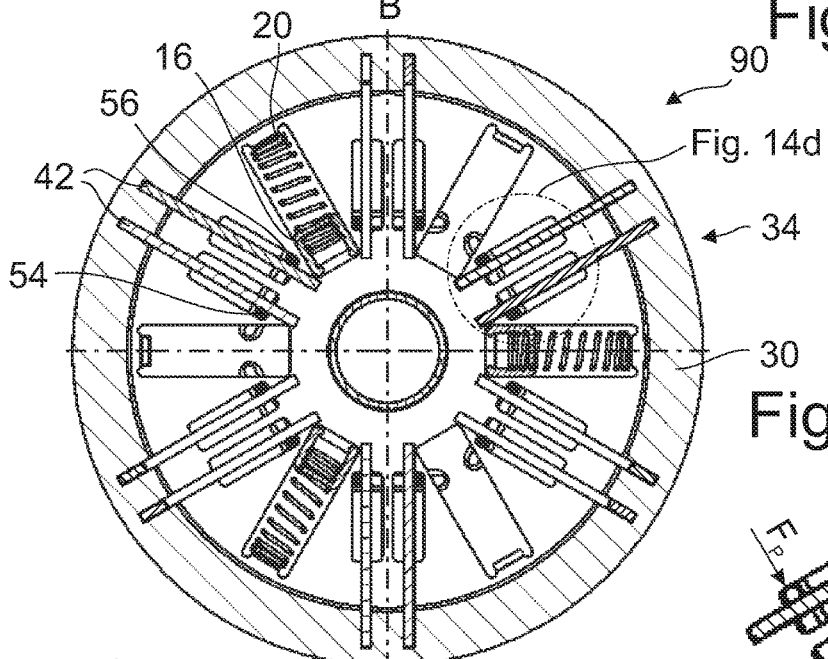
Fig. 14b
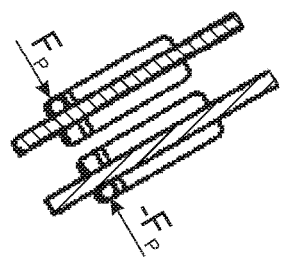
Fig. 14d

Fig. 15a
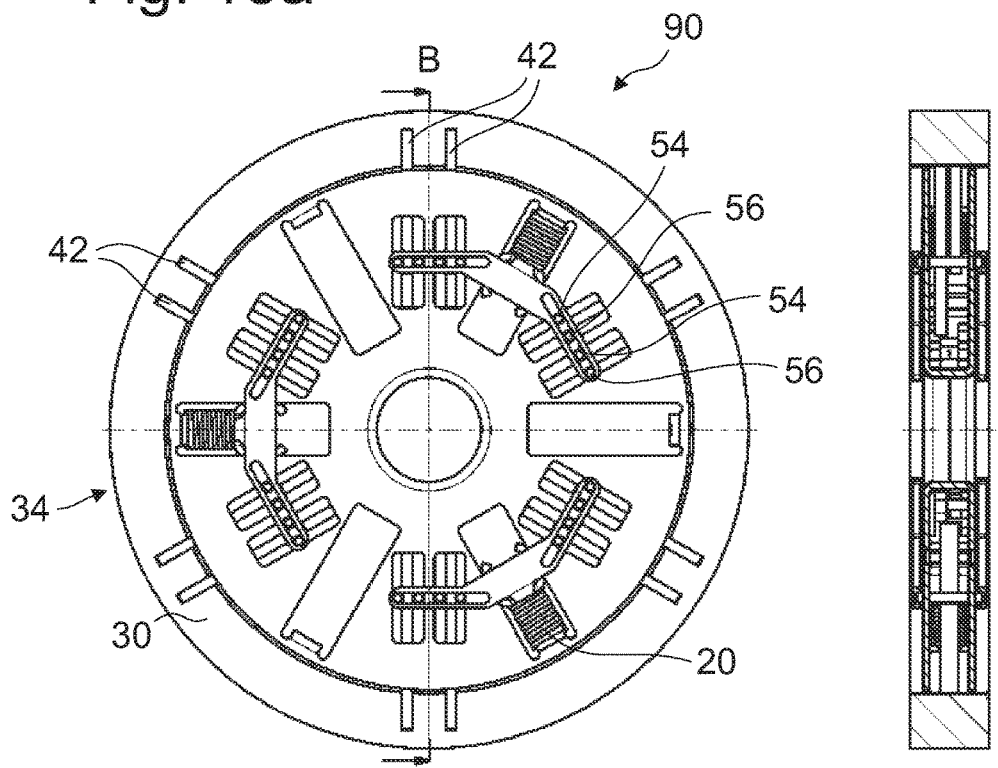
Fig. 15c
Fig. 15b
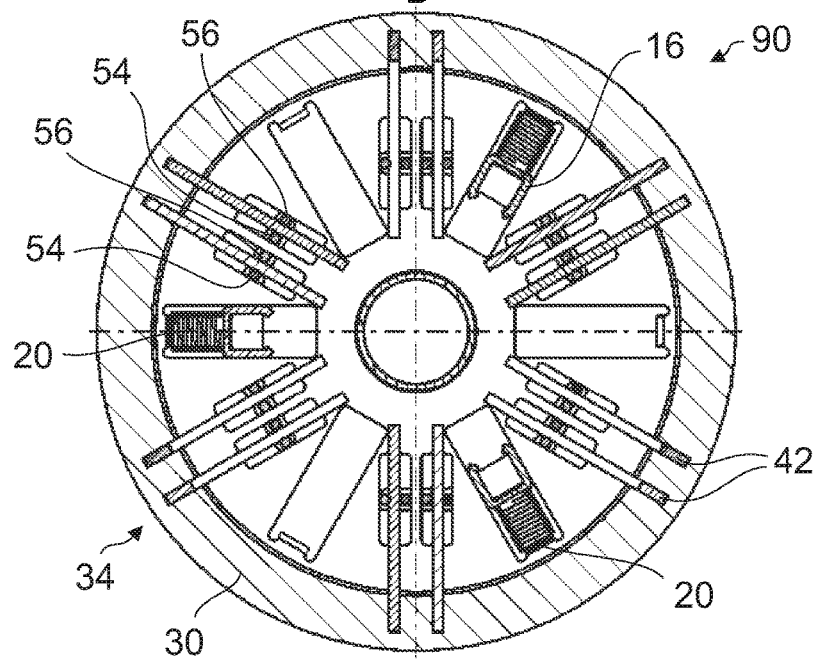

TORSIONAL VIBRATION DAMPER ASSEMBLY

CROSS REFERENCE TO RELATED APPLICATIONS

This is a U.S. national stage of application No. PCT/EP2013/071424, filed on Oct. 14, 2013. Priority is claimed on German Application No. DE 102012218921.1 filed Oct. 17, 2012, the content of which is incorporated herein by reference.

BACKGROUND OF THE INVENTION

1. Field of the Invention

The present invention is directed generally to torsional vibration damping arrangements, preferably for the drivetrain of a vehicle, and particularly to torsional vibration damping arrangements with radially acting preloading springs and restoring elements acting in circumferential direction having main axes that do not extend coaxially.

2. Detailed Description of the Prior Art

Numerous concepts are known for damping vibrations, particularly torsional vibrations, which are caused, for example, by rotating components (e.g., a crankshaft) in a motor vehicle. Torsional vibration dampers can be employed alternatively or in addition to balance shafts. Torsional vibration dampers of this kind generally comprise damping masses or deflection masses, and unwanted torsional vibrations can be damped by the mass inertia of these damping masses or deflection masses. A known torque-transmitting torsional vibration damping concept for decoupling the flywheel mass system of the engine from the transmission and drivetrain, for example, is a dual mass flywheel with a primary flywheel mass, a secondary flywheel mass, and a torsional vibration damping arrangement mounted therebetween.

DE 10 2010 053 542 A1 discloses a torsional vibration damping arrangement or vibration absorber in which deflection mass pendulum units comprise a deflection mass arranged annularly around a carrier and supported in circumferential direction with respect to the carrier by a plurality of elastically deformable restoring elements (e.g., leaf springs) which are secured thereto and extend radially inward. Provided in the carrier are radially displaceable flyweights or supporting elements at which the radially inwardly extending restoring elements can be supported in circumferential direction at respective carrier supporting regions or force application points. The supporting elements are preloaded radially inward into a basic position by preloading springs that are associated with these supporting elements and supported at the deflection mass. When there is little or no centrifugal force load, the flyweights or supporting elements are held in the basic position under preloading. As the rotational speed increases, the supporting elements shift radially outward as a result of centrifugal force as the compression of the preloading springs increases so that the carrier supporting regions at which the restoring elements extending radially inward from the deflection mass can be supported are displaced radially outward. This alters the free length of the restoring elements available for deflection between the connection thereof to the deflection mass and the respective carrier supporting regions in which they are supported via the supporting elements in circumferential direction with respect to the carrier. Accordingly, this variation of the free length also influences the effective pendulum length, shortening of which results in an increase in the natural frequency of the deflection mass pendulum units. As a result, the stiffness and therefore also the natural frequency of the deflection mass pendulum units is variable in a speed-dependent manner such that as the rotational speed increases the stiffness and therefore also the natural frequency of the torsional vibration damping arrangement increases. This is an attempt to achieve a speed adaptation of the deflection mass pendulum units to a vibration excitation order.

Known torsional vibration damping arrangements have an adjusting system which detunes the natural frequency of the torsional vibration damping arrangement or vibration absorber depending upon the speed in order to selectively cancel a vibration excitation order over a wide speed range. The adjusting system preferably comprises a plurality of flyweights or supporting elements distributed symmetrically around the circumference of the carrier to minimize unbalance and which are acted upon by a centrifugal force at speed. Further, the adjusting system comprises at least one restoring element or an adjusting spring that exerts a restoring force radially inward on the flyweight. The centrifugal force of the flyweights and the restoring forces of the springs are adapted to one another such that a desired position of the flyweight is achieved depending on current speed (order tracking). The position of a flyweight determines the force application point or oscillating point at a restoring element (e.g., flexible spring or vibration absorber spring) and accordingly directly influences the stiffness and, therefore, the natural frequency of the vibration absorber. The stiffness characteristic of the vibration absorber can be influenced by circumferential play (i.e., play in circumferential direction) between the restoring element and force application point(s) or oscillating point(s).

In conventional torsional vibration damping arrangements, the restoring elements in the form of leaf springs, are arranged inside of preloading springs or sensor springs (which exert radial restoring forces). However, when the restoring elements are arranged in this way, their oscillating angle for torsional vibration damping is limited by the internal dimensions of the sensor springs.

SUMMARY OF THE INVENTION

It is the object of one embodiment of the present invention to provide an improved torsional vibration damping arrangement or vibration absorber.

In one embodiment of the present invention a constructional separation between the vibration absorber springs and sensor springs can be carried out to increase the possible oscillating angle of the restoring elements or vibration absorber springs. While the vibration absorber springs in conventional torsional vibration damping arrangements are arranged inside the sensor springs, i.e., the main axis or longitudinal axis of a vibration absorber spring (e.g., restoring force in circumferential direction) extends substantially coaxial to a main axis or longitudinal axis of a sensor spring (e.g., radial restoring force), embodiments of the present invention provide torsional vibration damping arrangements in which the vibration absorber springs are arranged outside of the sensor springs, i.e., the main axis or longitudinal axis of a vibration absorber spring (e.g., restoring element in circumferential direction) does not extend coaxial to a main axis or longitudinal axis of a sensor spring (e.g., radial restoring element).

According to a one embodiment a torsional vibration damping arrangement, particularly for the drivetrain of an internal combustion engine vehicle and/or electric vehicle, comprises a carrier arrangement that is rotatable around an axis of rotation, a deflection mass movable in circumferential direction relative to the carrier arrangement, wherein the carrier arrangement and the deflection mass are coupled to be rotatable relative to one another via a plurality of flexible restoring elements arranged in circumferential direction and which extend from the deflection mass in direction of the carrier arrangement. A restoring element (particularly all of the restoring elements), (which act, e.g., in circumferential direction), is deformable and can oscillate in each instance around at least one force application point which is movable in radial direction under centrifugal force and is associated with the restoring element. The movable force application point is acted upon by a preloading force acting radially in direction of the axis of rotation by a preloading spring or sensor spring. In embodiment examples, the torsional vibration damping arrangement is characterized in that a main axis of the preloading spring and a main axis of the restoring element do not extend coaxially. Instead, the restoring element (i.e., a vibration absorber spring) is arranged outside of its associated preloading spring in circumferential direction. In particular, restoring elements associated with and cooperate with the preloading spring are arranged in circumferential direction outside of the preloading spring and on both sides of the preloading spring. The main axis of the preloading spring and the main axis of a restoring element associated with the preloading spring extend obliquely with respect to one another in radial direction, i.e., directed toward the axis of rotation, in each instance. For example, preloading springs and restoring elements can be arranged alternately in circumferential direction around the carrier, i.e., at least one restoring element can be arranged between two preloading springs. Other arrangements are also possible and will also be described later by way of example.

According to one embodiment of the invention, a restoring element acting in circumferential direction can be a restoring spring, particularly a leaf spring or a bar spring, particularly with a linear force characteristic.

According to one embodiment, a movable force application point, which is associated with the restoring element arranged outside of the preloading spring, can be guided or moved through a flyweight that is movable substantially in radial direction. The flyweight, e.g., a sliding block with centrifugal mass, is acted upon by the preloading force acting radially inward by the preloading spring such that the flyweight is located in a radial inner basic position in the absence of deflection of the deflection mass, i.e., in the inactive position of the torsional vibration damping arrangement. In embodiment examples, both flyweight and force application point can move in separate radial guides of the carrier arrangement. This means that the main axis of a guide for the flyweight and the main axis of a guide for a force application point do not extend coaxially in some embodiment examples.

In one embodiment, a relative position between a force application point and a flyweight cooperating with the force application point is variable under centrifugal force, i.e., during deflection of the deflection mass. This can be the case particularly when the main axis of the preloading spring and the main axis of the restoring element both extend radially in different directions. In this case, the force application point or oscillating point, which moves along the restoring element under centrifugal force, and the flyweight, which moves, e.g., along the guide of the preloading spring under centrifugal force, move apart in circumferential direction under centrifugal force and move closer together again when the centrifugal force subsides.

During deflections of the deflection mass, a force application point can be guided by one or more guides. A first guide direction extends along the main axis or longitudinal axis of the restoring element associated with the force application point, i.e., for example, along an elongated leaf spring or flexible spring. A second guide can extend perpendicular to the latter, i.e., perpendicular to the main axis of the restoring element associated with the force application point, such that—seen in circumferential direction—the force application point is positioned closer to the flyweight or preloading spring at a lower speed of the torsional vibration damping arrangement than at higher speed. The second guide of the force application point can be realized through guide arms formed integral with the flyweight and which have guide slots in which the force application point can reciprocate substantially perpendicular to the longitudinal axis of the restoring element under centrifugal force. In one embodiment, a movable force application point can be provided through a contact pin for the restoring element, which contact pin is movable along the main axis of the associated restoring element. In one embodiment, the contact pin can also be located in a flyweight which is movable along the restoring element.

In one embodiment, a plurality of restoring elements, which do not extend coaxial to the preloading spring or which extend outside of the preloading spring, are associated with a preloading spring such that force application points of the associated restoring elements are moved jointly in radial direction under centrifugal force by the preloading spring and at least one flyweight. Accordingly, a plurality of restoring elements can be actuated with one flyweight or with one preloading spring so that the required quantity of preloading springs or sensor springs and flyweights can be reduced.

In one embodiment, a flyweight which is guided along the main axis of the restoring element under centrifugal force and which comprises at least one force application point for the restoring element, is coupled with the preloading spring by at least one joint such that an angle between the main axis of the preloading spring and flyweight can be varied. The movement axis of the flyweight at the restoring element and the main axis of the preloading spring are not coaxial, but rather differ from one another in this embodiment. The flyweight and preloading spring or sensor spring are not rigidly coupled with one another, but rather can be coupled with one another via an oscillating support or an oscillating arm connected to the flyweight via a first joint and to a sensor mass via a second joint. Using a jointed coupling of this kind between preloading spring and a force application point or oscillating point to a flyweight, a degressive or progressive stiffness increase in the restoring element can be achieved with increasing speed.

Further, examples of torsional vibration damping arrangements are provided in which' a first restoring element that cooperates with, or is coupled with, the preloading spring is preloaded in a first direction in the inactive position of the torsional vibration damping arrangement, i.e., in the undeflected condition of the deflection mass, and a second restoring element which cooperates with, or is coupled with, the preloading spring is preloaded in a second direction opposite to the first direction in the inactive position. Depending on the embodiment form, the first restoring element and the second restoring element can be located in circumferential direction on different sides of the preloading spring or on the same side. The first restoring element and second restoring element form a pair of restoring elements, which are arranged directly adjacent to one another in circumferential direction in the latter case, and a pair of restoring elements, which are arranged in circumferential direction on opposite sides of the preloading spring in the former case. Generally, the torsional vibration damping arrangement can have a plurality of pairs of restoring elements arranged in circumferential direction.

In one embodiment, the geometric proportions and the preloading force ratios are preferably selected such that the opposed preloading forces resulting from the opposed preloading are identical in amount in the inactive position. Accordingly, there is an equilibrium of forces, and unwanted systematic errors can be avoided.

In one embodiment, the first restoring element of the pair in the inactive position of the torsional vibration damping arrangement can be preloaded in the first direction through direct contact with, or direct support at, a force application point associated with the first restoring element, while the second restoring element of the pair in the inactive position can be preloaded in the second direction through direct contact with, or direct support at, a force application point associated with the second restoring element. In other words, the first restoring element and the second restoring element can be arranged at at least one of the force application points associated therewith without circumferential movement play (i.e., play in circumferential direction). As a result of the respective direct (pressing) contact between restoring element (e.g., leaf spring) and force application point, there is a slight bending of the restoring element already in the inactive position which can range from 1% to 10% of the maximum permissible bending. Circumferential play and, therefore, a force-free change in contact which would otherwise negatively influence an aggregate stiffness of the torsional vibration damping arrangement can be prevented due to the preloading in inactive position.

In one embodiment, exactly one force application point, which is movable in radial direction, can be associated in each instance with each of the two restoring elements associated with the preloading spring (one-sided actuation). The respective force application points of the first restoring element and second restoring element are arranged on different sides of the restoring elements to achieve the opposed preloading forces in the inactive position. In other words, a first restoring element can, for example, oscillate around a first contact pin which is located, for example, on a side of the first restoring element in counterclockwise direction viewed in circumferential direction. On the other hand, a second restoring element can oscillate around a second contact pin which—viewed in circumferential direction—is located on a side of the second restoring element in clockwise direction. Both contact pins can be in direct contact with their respective restoring elements acting in circumferential direction in the inactive position of the torsional vibration damping arrangement. However, examples with play are also conceivable.

In one embodiment, two force application points, which are movable in radial direction can be associated with each restoring element of the pair, wherein the two force application points can move up and down radially under centrifugal force opposite to one another on different sides of the respective restoring element, and wherein the two force application points are arranged asymmetrically with respect to the respective restoring element in the inactive position. This means, for example, that the restoring element on one side in the inactive position is in direct contact with a first force application point, while there is play in circumferential direction (circumferential play) on the other side between the restoring element and a second force application point.

Accordingly, the two force application points are located at different distances from the restoring element, where one distance is zero and the other distance is greater than zero. In one embodiment, it can be provided further that the asymmetrical arrangement of two first force application points with respect to the first restoring element is the inverse of the asymmetrical arrangement of two second force application points with respect to the second restoring element. Compared to other embodiments, a construction of the adjusting system of the torsional vibration damping arrangement with alternately actuated restoring elements that are preloaded in this way can come closest to an ideal stiffness characteristic (free from play) with the quantity of restoring elements remaining the same.

Using an asymmetrical arrangement of the force application points, formed, e.g., by pin elements in the flyweight such that a deflection or bending of the restoring element takes place in the zero position (inactive position) or selectively through asymmetric arrangement of the restoring elements relative to the flyweight or through asymmetric arrangement of the flyweights (guide path of the flyweights) relative to the restoring elements, or a combination of the different possibilities, a mutual preloading of the restoring elements can be realized and tolerance-dependent play in the system can be eliminated.

According to a further aspect, a drivetrain for a vehicle is provided which comprises at least one torsional vibration damping arrangement according to the present invention.

In accordance with the present invention, more oscillating angles and more adjusting paths can be realized for a torsional vibration damping arrangement than in conventional torsional vibration damping arrangements. If, in addition, a plurality of flyweights are combined and associated in each instance with a preloading spring or sensor spring, a plurality of restoring elements can be actuated with one flyweight so that the required quantity of sensor springs and flyweights can be reduced. A further advantage consists in the possibility of shaping the guide paths at which the contact pins are supported. The restoring elements or flexible springs are further radially oriented so as to be distributed around the axis of rotation in a star-shaped manner.

BRIEF DESCRIPTION OF THE DRAWINGS

Embodiment examples of the present invention will be described in the following with reference to the accompanying drawings. The drawings show:

FIGS. 5a, 5b are two longitudinal sectional views of an annularly formed deflection mass in different section planes;

FIG. 7 is a detail of a deflection mass pendulum unit;

FIG. 8 is a view of a supporting element of the deflection mass pendulum unit viewed from the radially outer side;

FIG. 9 is a perspective view of the supporting element from FIG. 8;

FIG. 10 is a side view of the supporting element from FIG. 8;

FIG. 11 is the supporting element from FIG. 8 in section along a line XI-XI in FIG. 10;

FIGS. 12a-12c are a torsional vibration damping arrangement with the flyweights and sensor springs relocated to regions that are not concentric to the flexible spring with radial orientation, at low speed;

FIGS. 14a-14d are a torsional vibration damping arrangement in which the flyweights and sensor springs are relocated to regions that are not concentric to the flexible spring with parallel arrangement in pairs and with one-sided actuation, at low speed;

FIGS. 15a-15c are a torsional vibration damping arrangement in which the flyweights and sensor springs are relocated to regions that are not concentric to the flexible spring with parallel arrangement in pairs and with alternating actuation, at high speed;

DETAILED DESCRIPTION OF THE PRESENTLY PREFERRED EMBODIMENTS

Figure 1:
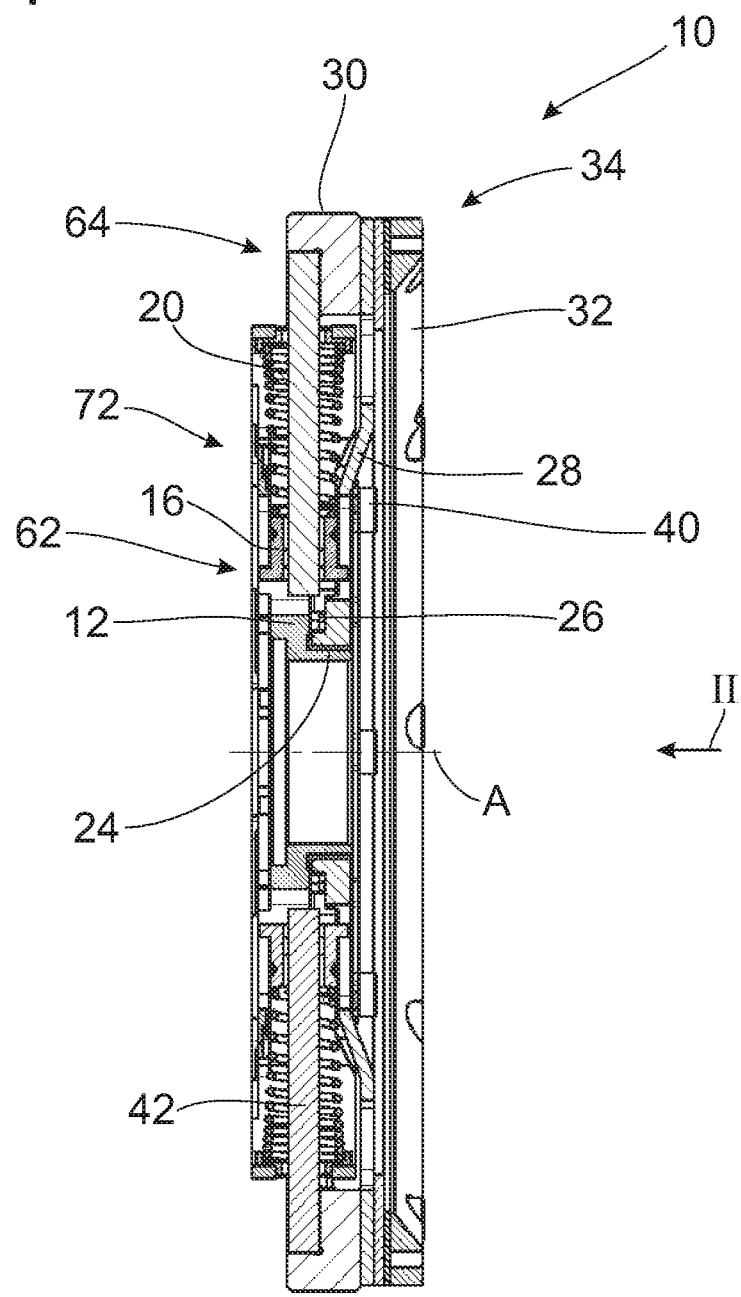
FIG. 1 is a longitudinal sectional view of a conventional torsional vibration damping arrangement.

In the following description, components which function identically or similarly are denoted by identical reference numerals.

Figure 2:
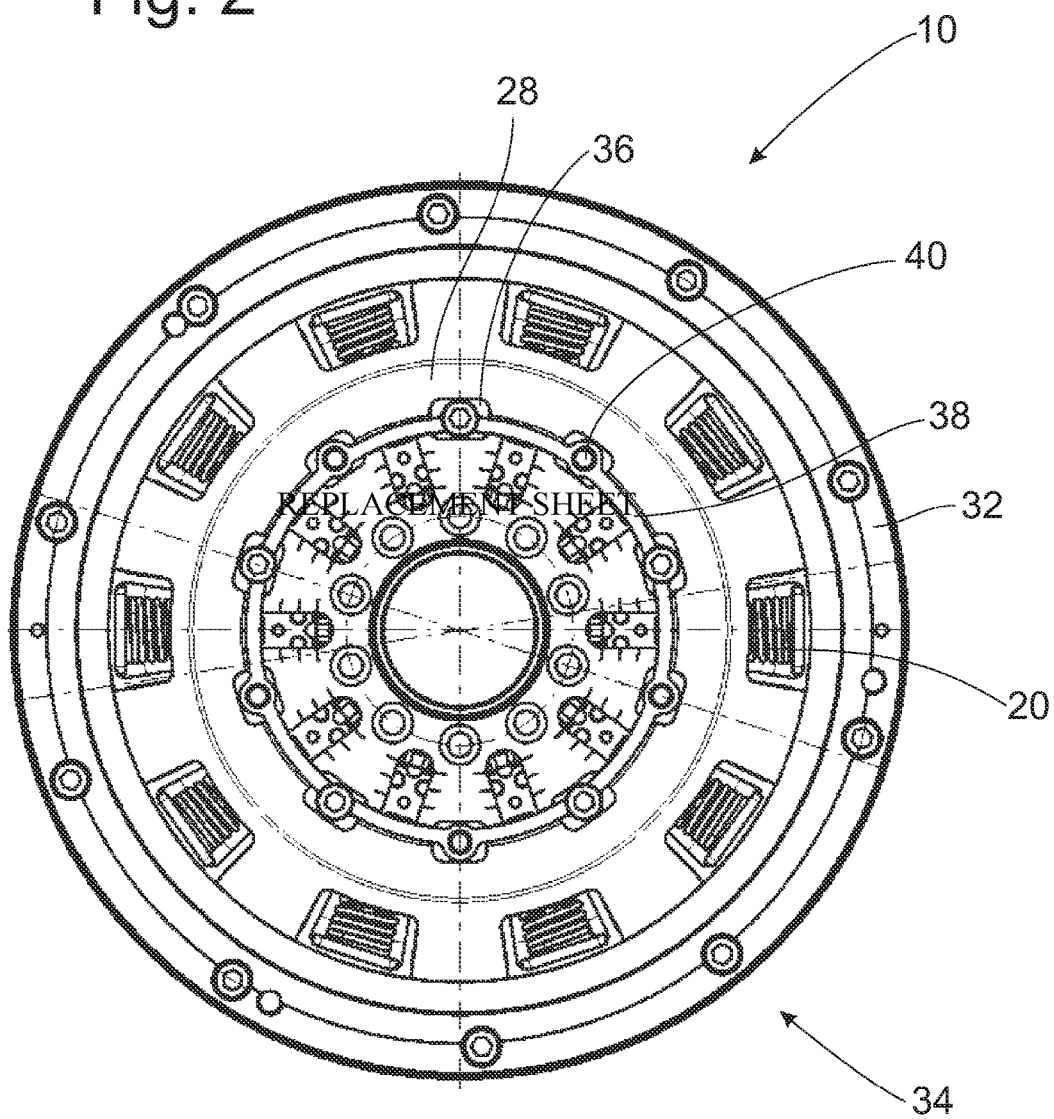
FIG. 2 is an axial view of the torsional vibration damping arrangement from FIG. 1 in viewing direction II in FIG. 1.
Figure 3:
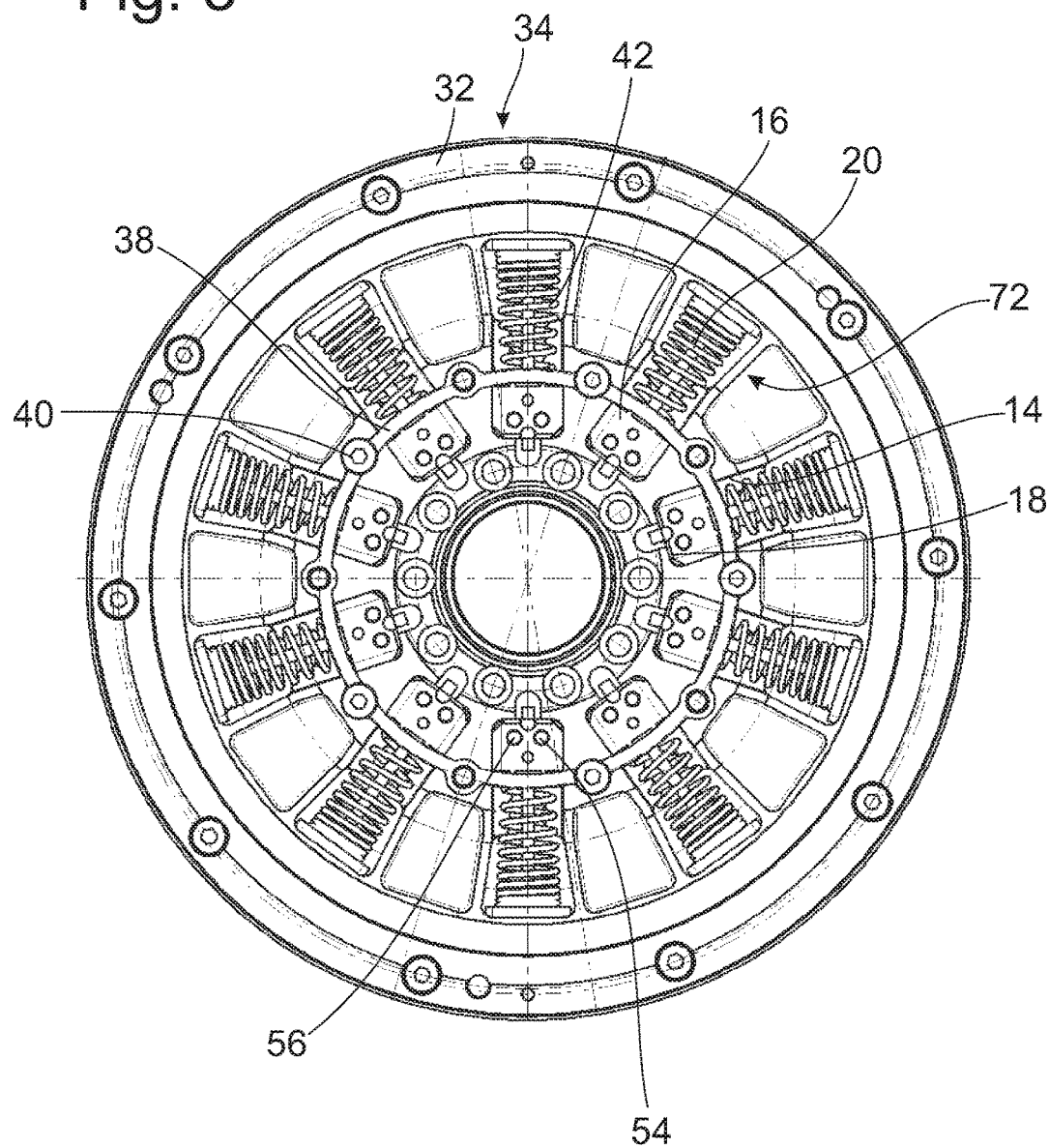
FIG. 3 is a view corresponding to FIG. 2 in which a carrier disk of an annularly formed deflection mass is omitted.

FIGS. 1 to 3 show a conventional torsional vibration damping arrangement, designated generally by 10, which can be integrated in, or coupled with, a drivetrain of a vehicle to perform the functionality of a speed-adaptive vibration absorber. The terminology used to describe embodiment examples is based on the following description of the conventional torsional vibration damping arrangement.

Figure 4:
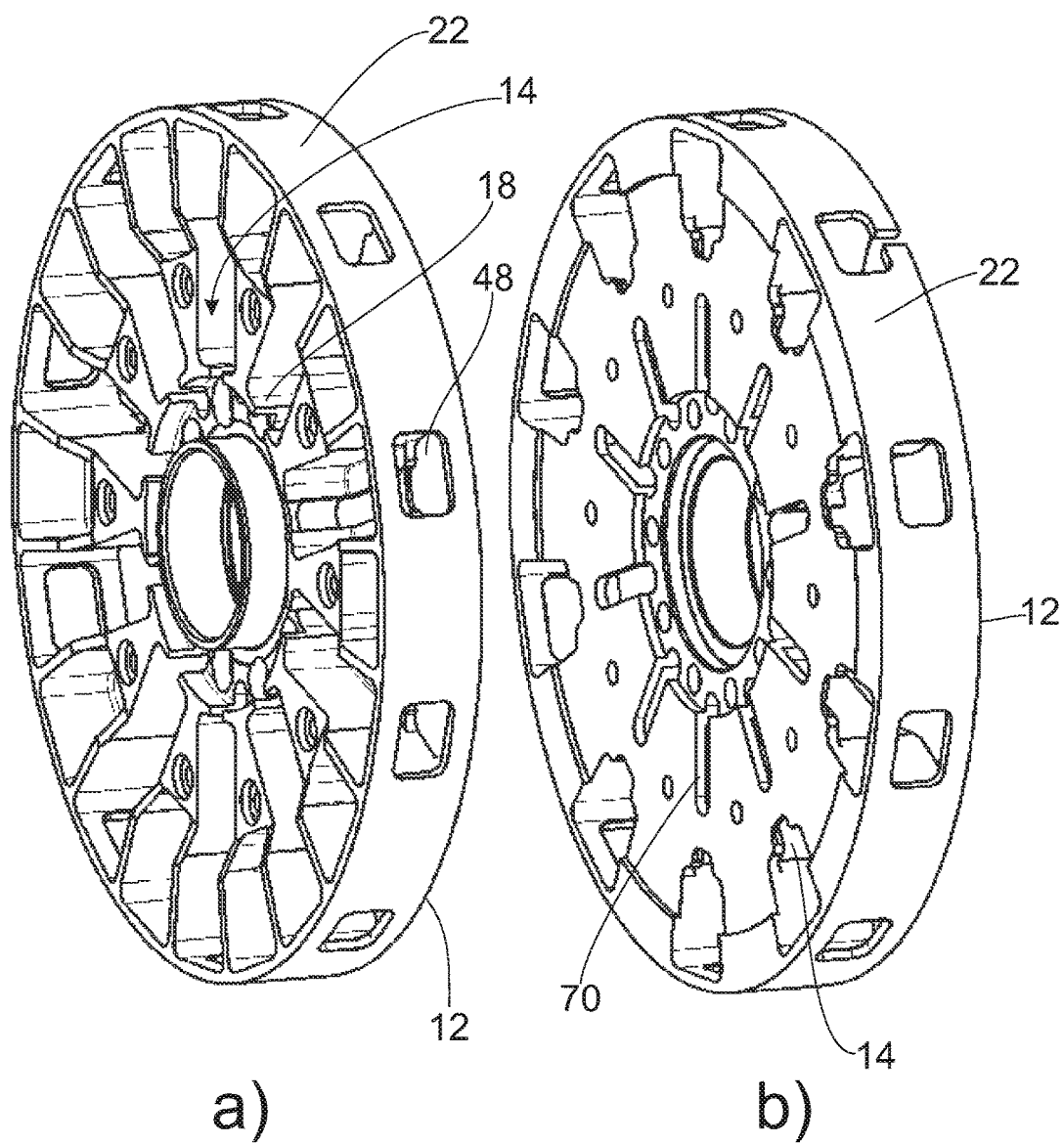
FIGS. 4a, 4b are two perspective views of a carrier of the torsional vibration damping arrangement from FIG. 1 viewed from different sides.

The conventional torsional vibration damping arrangement 10 comprises a carrier arrangement 12, which is to be fastened by screws to a drivetrain component for rotating therewith around an axis of rotation A. In the diagrams shown in FIGS. 3 and 4, guides 14 are provided in this carrier arrangement or carrier 12 preferably approximately circumferentially equidistant at a plurality of circumferential positions, flyweights 16, also referred to as supporting elements 16, received in these guides 14 to be radially movable. The guides 14 are formed as substantially radially extending, elongated cutouts that are limited radially inwardly by stops 18 defining a radially inner basic position of the flyweights 16. The flyweights 16 can be held in contact with the stops 18 radially inwardly, i.e., so as to be preloaded in their basic position, by preloading springs 20 formed as compression coil springs. To this end, the preloading springs 20 can be supported at a radially outer annular edge region 22 of the carrier 12.

Figures 5, 6:
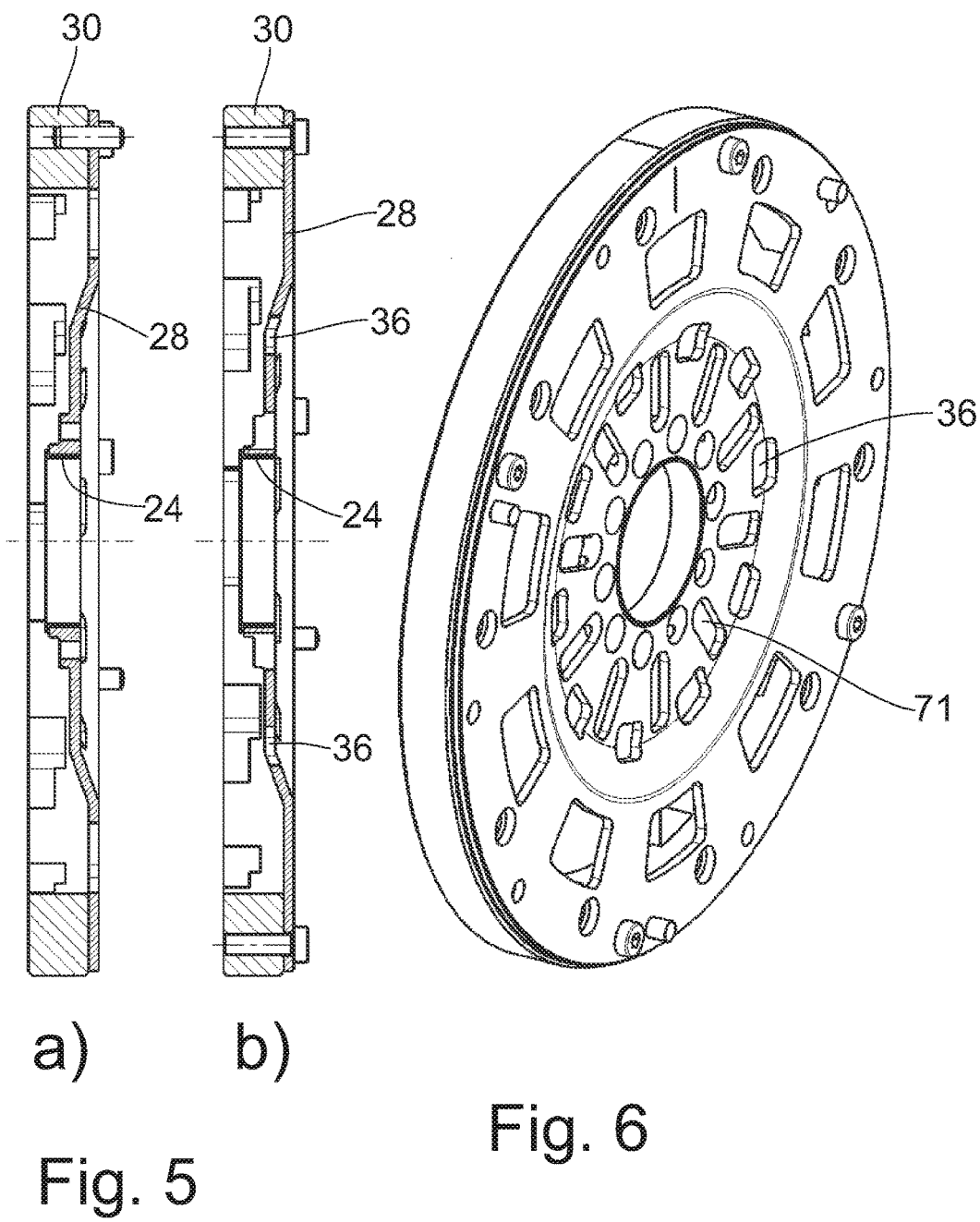
FIG. 6 is a perspective view of the annularly formed deflection mass.
Figure 13A:
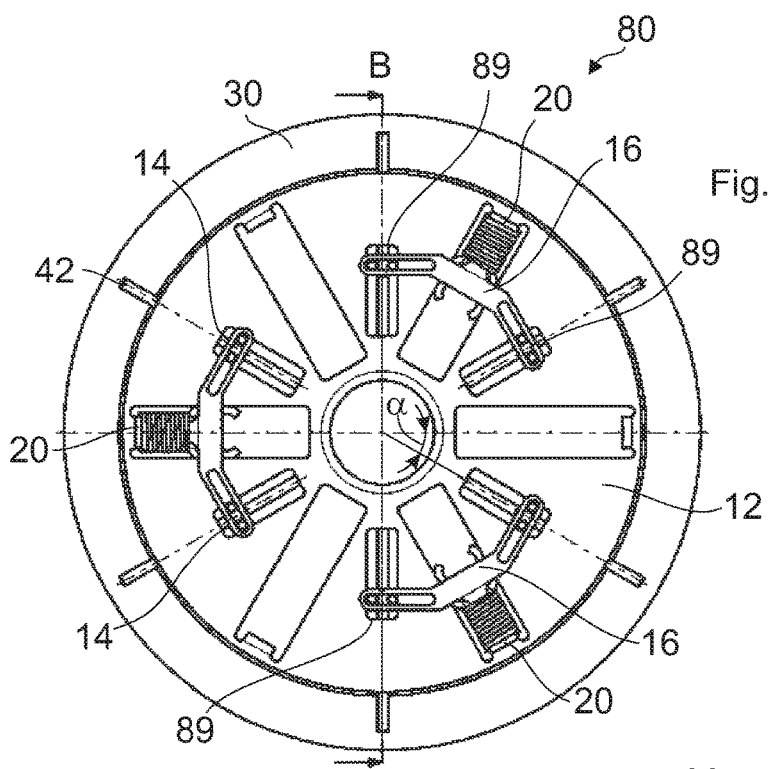
FIGS. 13a-13d are the torsional vibration damping arrangement according to FIG. 12, at high speed.
Figure 13D:
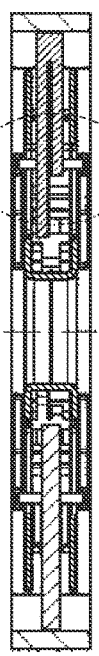
Figure 13B:
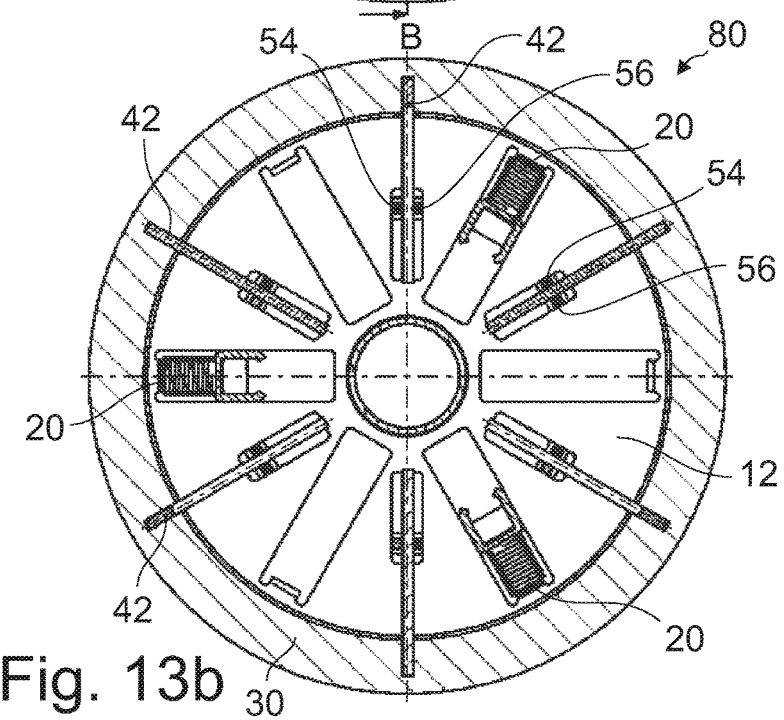
Figure 13C:
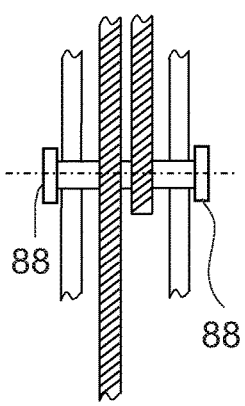

A carrier disk 28 can be supported at the carrier 12 via a radial bearing 24 and an axial bearing 26 to be basically rotatable around the axis of rotation A with respect to the carrier 12. In its radially outer region, the carrier disk 28 carries a mass ring 30, for example, through screw connection at an axial side. A further mass ring 32 can be fastened to the other axial side of the carrier disk 28. Together with the mass ring 30 and possibly also mass ring 32, the carrier disk 28 forms a deflection mass or pendulum mass, designated generally by 34, which can oscillate in circumferential direction (i.e., tangential direction) around the carrier arrangement 12 to damp torsional vibrations. The carrier disk 28 and, therefore, the deflection mass 34 can be axially secured to the carrier 12 through a plurality of bolts 40, also shown in FIG. 6, for example threaded bolts, which pass through cutouts 36 elongated in circumferential direction and which hold an axial retaining ring 38 at the side of the carrier disk 28 remote of the carrier 12. Because of the circumferential movement play of the bolts 40 in the cutouts 36 of the carrier disk 28, the deflection mass 34 is rotatable around the axis of rotation A in corresponding circumferential movement play with respect to the carrier 12 such that bolts 40 and cutouts 36 cooperate to limit relative rotational angle.

The deflection mass arrangement 34 is coupled with the carrier 12 for power transmission by a plurality of circumferentially successive, substantially radially extending springs or restoring elements 42. These restoring elements 42 formed, as leaf springs or generally as bending beams can be fastened in their radially outer area 44 to the mass ring 30 by a respective clamping arrangement 46. Proceeding from this fastening, they extend radially inward through openings 48 in the edge region 22 of the carrier arrangement 12 into a respective preloading spring 20 in conventional torsional vibration damping arrangement 10 for radial preloading of the flyweights 16. As can be seen, in the conventional torsional vibration damping arrangement 10, the main axes of the preloading spring 20 and restoring element 42 extend substantially coaxially.

As is illustrated in FIG. 7, the restoring element 42, or every restoring element 42, in the conventional torsional vibration damping arrangement 10 extends by its radially inner end region 50 into and through a central aperture 52 of an associated flyweight 16 or flywheel mass 16. In the region of aperture 52, two circumferential supporting regions 58, 60, which are provided at contact pins or contact bolts 54, 56, are spaced apart laterally at the flyweight 16. These circumferential supporting regions 58, 60 constitute radially displaceable force application point around which an associated restoring element 42 can deform during deflection of the deflection mass 34. The mass 34 oscillates around the axis of rotation A. These circumferential supporting regions or force application point 58, 60, which in many embodiment examples can be located on both sides of the radially inner end region 50 of the associated restoring element 42, but asymmetrically with respect to it, in circumferential direction define in their entirety a carrier supporting region 62, whereas a deflection mass supporting region 64 is formed in the region in which the radially outer end region 44 of the restoring element 42 is secured to the mass ring 32 or, generally, to the deflection mass 34.

In the torsional vibration damping arrangement 10 having the constructional design mentioned above with reference to FIGS. 1 to 11, a flyweight or supporting element 16 which is radially movably guided in the carrier 12, the restoring element 42 or vibration absorber spring 42 cooperating with the latter, the preloading spring 20 which preloads the flyweight 16 radially inward into its radial basic position shown in FIG. 7 (in the inactive position of the torsional vibration damping arrangement without deflection in circumferential direction), and the deflection mass 34 respectively form a deflection mass pendulum unit 72. In the depicted embodiment form, only by way of example, a total of ten such deflection mass pendulum units 72 are provided. The carrier 12 is a shared carrier for the supporting elements 16 of all of the deflection mass pendulum units 72, and the deflection mass 34 is a shared deflection mass for all of the deflection mass pendulum units 72.

Now that the functioning of the conventional torsional vibration damping arrangement 10 has been described and the terminology employed herein has been introduced referring to FIGS. 1 to 11, the present invention which further develops torsional vibration damping arrangements will be described in the following.

In a torsional vibration damping arrangement 80 which is shown schematically in FIGS. 12 and 13, restoring elements 42 extending radially from the deflection mass 34 into the carrier arrangement 12 are fixedly clamped in radial direction into the (vibration absorber) mass ring 30. The restoring elements 42 are also oriented radially in a star-shaped manner around the axis of rotation A in this case. The vibration absorber mass ring 30 is supported radially and axially via the carrier arrangement 12 such that only a relative rotation in circumferential direction (tangentially) is possible. During rotation, the restoring elements 42 acting in circumferential direction are supported at flyweights 16 or at contact pins 54, 56 which are in turn supported at guide paths 14 which are integrated in the carrier component part 12 and can bend in circumferential direction. On or in guide paths 14, the flyweights 16 can adjust in radial direction under centrifugal force against a restoring force of an associated preloading spring 20 or sensor spring 20 and can accordingly change the articulation point or oscillating point, i.e., the force application point, of the restoring elements 42 and, therefore, also the spring stiffness as a function of speed.

Accordingly, FIGS. 12 and 13 show a torsional vibration damping arrangement 80 according to an embodiment example of the present invention. It comprises a carrier arrangement 12 which is rotatable around the axis of rotation A and a deflection mass 34 which is movable in circumferential direction relative to the carrier arrangement 12. The carrier arrangement 12 and deflection mass 34 are coupled so as to be rotatable relative to one another via a plurality of flexible restoring elements 42 (e.g., leaf springs or flexible springs) which are arranged in circumferential direction and which extend from the deflection mass 34 in direction of the carrier arrangement 12. A restoring element 42 is deformable in each instance around at least one force application point 54, 56, which is movable in radial direction under centrifugal force and associated with the restoring element 42. The radially movable force application points 54, 56 are acted upon by a preloading force acting radially in direction of the axis of rotation A by a preloading spring 20. In contrast to the conventional torsional vibration damping arrangement 10 described in the preceding, a main axis or longitudinal axis 82 of the preloading spring 20 and a main axis or longitudinal axis 84 of the restoring element 42 are not coaxial to one another in the torsional vibration damping arrangement 80. As can be seen clearly in FIG. 12, the extensively radially extending restoring elements 42 and the preloading springs 20 associated in each instance are arranged so as to be offset with respect to one another in circumferential direction. In other words, a restoring element 42 is arranged outside of its associated preloading spring 20 in circumferential direction. In the embodiment shown in FIG. 12, the main axis 82 of the preloading spring 20 and the main axis of a restoring element 42 cooperating with the preloading spring 20 in a deflection mass pendulum unit extend obliquely relative to one another, in each instance in radial direction with respect to the axis of rotation A and in the carrier arrangement 12.

In the embodiment example in FIGS. 12 and 13, the movable force application points or contact pins 54, 56 associated with a restoring element 42 are guided in each instance through a flyweight 16 which is movable in radial direction and which is acted upon by the preloading spring 20 cooperating with the flyweight 16 by preloading force acting radially inward such that in the inactive position, i.e., in the absence of deflection of the deflection mass 34, it engages in a radial inner basic position. According to FIGS. 12 and 13, the flyweight 16 coupled with the preloading spring 20 can also provide guides 86 for the contact pins 54, 56 actuated by the flyweight 16. The guides 86 and guide slots thereof in which the contact pins or force application points 54, 56 are guided during a radial up-and-down motion of the flyweight 16 are formed substantially perpendicular to the associated main axes 84 of the radially extending restoring elements 42. Accordingly, the torsional vibration damping arrangement 80 can be constructed in general to guide a force application point 54, 56 by the flyweight 16 cooperating with the latter under centrifugal force in a guide 86 perpendicular to the main axis 84 of the associated restoring element 42 such that at low speed (see FIG. 12) of the torsional vibration damping arrangement 80 the force application point 54 and/or 56 is positioned closer to the flyweight 16 or preloading spring 20 than at high speed (see FIG. 13).

While FIG. 12 shows the torsional vibration damping arrangement 80 in a front view (upper left) FIG. 12A, rear view (bottom) FIG. 12B, and lateral sectional view (upper right) FIG. 12C, FIG. 13 shows the same torsional vibration damping arrangement 80 at high speed, i.e., in a virtually completely deflected condition. Since the main axis 82 of the preloading springs 20 and main axis 84 of the restoring elements 42 arranged on both sides thereof in circumferential direction extend at a fixed angle α relative to one another, the distance between the force application points 54, 56, which move radially outward along the main axis 84 as the speed increases, and the flyweight 16 or preloading spring 20 increases as the speed increases.

FIG. 12 shows the adjusting system or torsional vibration damping arrangement 80 at low speed in the unadjusted condition, i.e., the flyweights 16 are located in the radially inner basic position. By relocating a preloading spring or sensor spring 20 into a region that is not concentric to a leaf spring associated with the sensor spring 20, this leaf spring serving as restoring element 42, there is no risk of a collision between the sensor spring 20 and leaf spring 42. Accordingly, more oscillating angle and more adjusting path can be realized compared to conventional torsional vibration damping arrangements.

If, in addition, a plurality of flyweights 16 are assembled and associated with a sensor spring 20 in each instance in contrast to conventional approaches, a plurality of restoring elements 42 can be actuated simultaneously with one flyweight 16 and one preloading spring 20 as is shown in FIG. 12, so that a required quantity of preloading springs 20 or sensor springs 20 and flyweights 16 can be reduced. This means that FIG. 12 shows an embodiment in which a plurality of restoring elements 42 are associated with a preloading spring 20 which do not extend coaxial to the preloading spring 20 such that the force application points 54, 56 of the associated restoring elements 42 can be moved collectively under centrifugal force by the preloading spring 20. In FIG. 12, the two restoring elements 42 associated with a preloading spring 20 are arranged in each instance outside of the preloading spring 20 and at both sides of the preloading spring 20 in circumferential direction. Accordingly, a deflection mass pendulum unit comprises, in this case, a preloading spring 20 and two restoring elements 42. However, deflection mass pendulum units with a preloading spring 20 and only one restoring element are also conceivable. A further advantage of the embodiment form shown in FIG. 12 consists in the possibility of the arrangement of guide paths 14 at which the contact pins 54, 56 are supported.

FIG. 13 shows the same system as that in FIG. 12, but in a condition adjusted to a higher speed. The contact pins 54, 56 are guided radially along a restoring element 42 by flyweights 16 or guide vanes 86 thereof and can move simultaneously perpendicular to axis 84 in circumferential direction (in the slot of guide 86). A limiting of the contact pins 54, 56 in circumferential direction is determined in one direction by the contour of a guide 14 and in the other direction by the leaf spring or restoring element 42. The contact pins 54, 56 can be secured axially, preferably by positive engagement (e.g., retaining rings or a press fit of the ends, see reference numeral 88). One end of the pin guide contour 14 outwardly in radial direction can be used additionally as stop or path limit 89 for the flyweights 16 for protecting the sensor spring 20.

A comparison of the views in FIGS. 12 and 13 clearly shows that a relative position between a force application point 54 or 56 and the center of gravity of a flyweight 16 or sensor spring 20 cooperating therewith can be varied under centrifugal force.

FIGS. 14 and 15 show a further embodiment form of a torsional vibration damping arrangement 90 in which the flyweights 16 and the sensor springs 20 are relocated to regions which are not concentric or coaxial to a restoring element 42. In this case, the restoring elements 42 are arranged in pairs so as to be parallel (i.e., parallel main axes 84) and are actuated, respectively, on one side. One-sided actuation means a supporting point or force application point in only one circumferential direction—in contrast to the alternating actuation with force application points for each restoring element 42 on both sides in circumferential direction which is shown in FIGS. 12 and 13.

The basic construction of the torsional vibration damping arrangement 90 corresponds to the preceding description so that reference may be had to the relevant statements made above. The embodiment example in FIGS. 14 and 15 differs from FIGS. 12 and 13 particularly in that in this case not only are two restoring elements 42 associated with the preloading spring 20 (a first to the left, or counterclockwise, of the preloading spring 20 and a second to the right, or clockwise, of the preloading spring 20), but four restoring elements 42 are associated with a preloading spring 20 (two to the left of the preloading spring 20 and two to the right of the preloading spring 20). Accordingly, in this case a deflection mass pendulum unit comprises a preloading spring 20 and two pairs of restoring elements (four restoring elements). This shows the flexibility of the concept according to one embodiment of the invention.

However, it will be seen from FIG. 14, which shows the torsional vibration damping arrangement 90 at different speeds, that only one pin/bolt 54 or 56 and, consequently, also only one force application point or oscillating point (→asymmetry) can be provided in the supporting elements shown here for a restoring element 42. Accordingly, an individual restoring element 42 can support only in one circumferential direction at the force application point 54 or 56.

As is shown in FIG. 14, the overall construction can be arranged such that with respect to the circumferentially successive restoring elements 42 of a pair of restoring elements, there is alternately a pin 54 for providing a force application point in a first circumferential direction and, with respect to the subsequent restoring element 42 of the pair, a pin 56 is provided so that a force application point can be realized in a second, opposing circumferential direction, i.e., on the other side of the restoring element 42. As a result, only half of the restoring elements 42 are operative during each half-oscillation. However, the total stiffness of the torsional vibration damping arrangement 90 remains substantially the same because the quantity of restoring elements 42 is doubled in comparison to FIGS. 12 and 13.

According to one embodiment, a first restoring element 42 (e.g., on the left-hand side) of a pair of restoring elements 42 can be preloaded in a first direction in inactive position of the torsional vibration damping arrangement 90 (or at the zero crossing of the vibration absorber deflection) and a second restoring element 42 (e.g., on the right-hand side) can be preloaded in the inactive position in a second direction opposite to the first direction. The different preloading or bending of the two restoring elements 42 of the pair can preferably be selected such that opposed preloading forces resulting from the opposed preloading are identical with respect to amount in the inactive position or zero crossing. FIG. 14*d* shows the preload direction (Fp and −Fp) for the paired restoring. To designate the balance of forces on the paired restoring elements, one force is labeled Fp and the other force is labeled −Fp. The first restoring element 42 or first flexible spring 42 (on the left-hand side) of the pair can be preloaded in the first direction in inactive position of the torsional vibration damping arrangement 90 by direct contact with a force application point at the pin 54 associated with the first restoring element 42. The second restoring element 42 (right-hand side) of the pair can be preloaded in the second direction in inactive position (i.e., no deflection) by direct contact with a force application point at pin 56 associated with the second restoring element 42. In other words, the two directly adjacent restoring elements 42 forming an associated pair of restoring elements can also directly contact their respective force application points or pins 54, 56 in the inactive position. Examples with circumferential play between the engagement point and restoring element are also conceivable. According to one embodiment, in the inactive position of the torsional vibration damping arrangement 90, a respective preloading or bending of the restoring elements 42 in a range of from 1% to 10% of a maximum bending of a restoring element 42, e.g., a leaf spring, can result due to the asymmetrical installation. A vibration absorber stiffness that is as constant as possible and which has a characteristic curve for a respective speed that is as linear as possible and strictly monotonic can be achieved by the preloading.

The embodiment illustrated in FIG. 14 shows a first force application point 54 movable in radial direction along the first restoring element 42 (to the left or counterclockwise) of a pair and a second force application point 56 movable in radial direction along the second restoring element 42 (to the right or clockwise) of the pair. In the inactive position, the force application points 54, 56 can be in direct pressing contact with the first restoring element 42 and second restoring element 42 on different sides of the restoring element 42, namely, alternately on the left-hand side or counterclockwise and on the right-hand side or clockwise, in order to preload the pair of restoring elements 42 in opposite directions in the inactive position of the torsional vibration damping arrangement 90. In the embodiment example of FIG. 14, exactly one force application point 54 (left-hand side) and 56 (right-hand side) which is movable in radial direction is associated with each of the two restoring elements 42. The respective force application points 54, 56 of the first restoring element 42 and second restoring element 42 can be arranged on different sides of the restoring elements 42 to achieve the opposed preloading.

In other, alternately actuated embodiment forms in which two force application points 54, 56 which are movable in radial direction but are arranged asymmetrically around the restoring element 42 can be associated with each restoring element 42 (see, e.g., FIG. 15), the opposed preloading in the inactive position can be achieved through direct contact of the restoring element 42 with one of its two associated force application points 54, 56. In embodiment examples of this type, the two asymmetric force application points 54, 56 move radially outward and inward, respectively, opposite one another on different sides (left, right) of the respective restoring element 42 under centrifugal force.

In contrast to the above-described alternately actuated torsional vibration arrangements 10 or 80, the two force application point 54, 56 can both be arranged asymmetrically with respect to their respective restoring element 42 in the inactive position (i.e., no deflection of the deflection mass 34) to achieve the opposed preloading. In other words, in a left-hand deflection mass pendulum unit of a pair of deflection mass pendulum units the restoring element 42 can directly contact the left-hand pin 54 in the inactive position. On the other hand, there can be circumferential play between the left-hand restoring element 42 and the right-hand pin 56 associated with it. The situation in the right-hand deflection mass pendulum unit can be exactly the inverse, i.e., the right-hand restoring element 42 can directly contact the right-hand pin 56 associated with it in the inactive position. There can be circumferential play between the right-hand restoring element 42 and its left-hand contact pin 54.

To summarize, all of the alternately preloaded embodiment examples described above are characterized in that the position of at least one movable force application point 54, 56 is asymmetrical with respect to the restoring element 42 cooperating with it in the inactive position or in the zero crossing of the torsional vibration damping arrangement. That is, the radially extending restoring element 42, e.g., a leaf spring, cannot be considered as axis of symmetry of the force application points 54, 56. The asymmetry can be achieved by an asymmetrical arrangement of the pin elements 54, 56 in the guides 14 in such a way that a deflection of the restoring elements 42 takes place in the zero position. Alternatively, the restoring elements 42 can be positioned asymmetric to the guides 14, or the guides 14 can be positioned asymmetric to the restoring elements 42. A mutual preloading of the restoring elements 42 can also be realized through a combination of the different possibilities, and tolerance-dependent play in the system can be eliminated.

Figure 16:
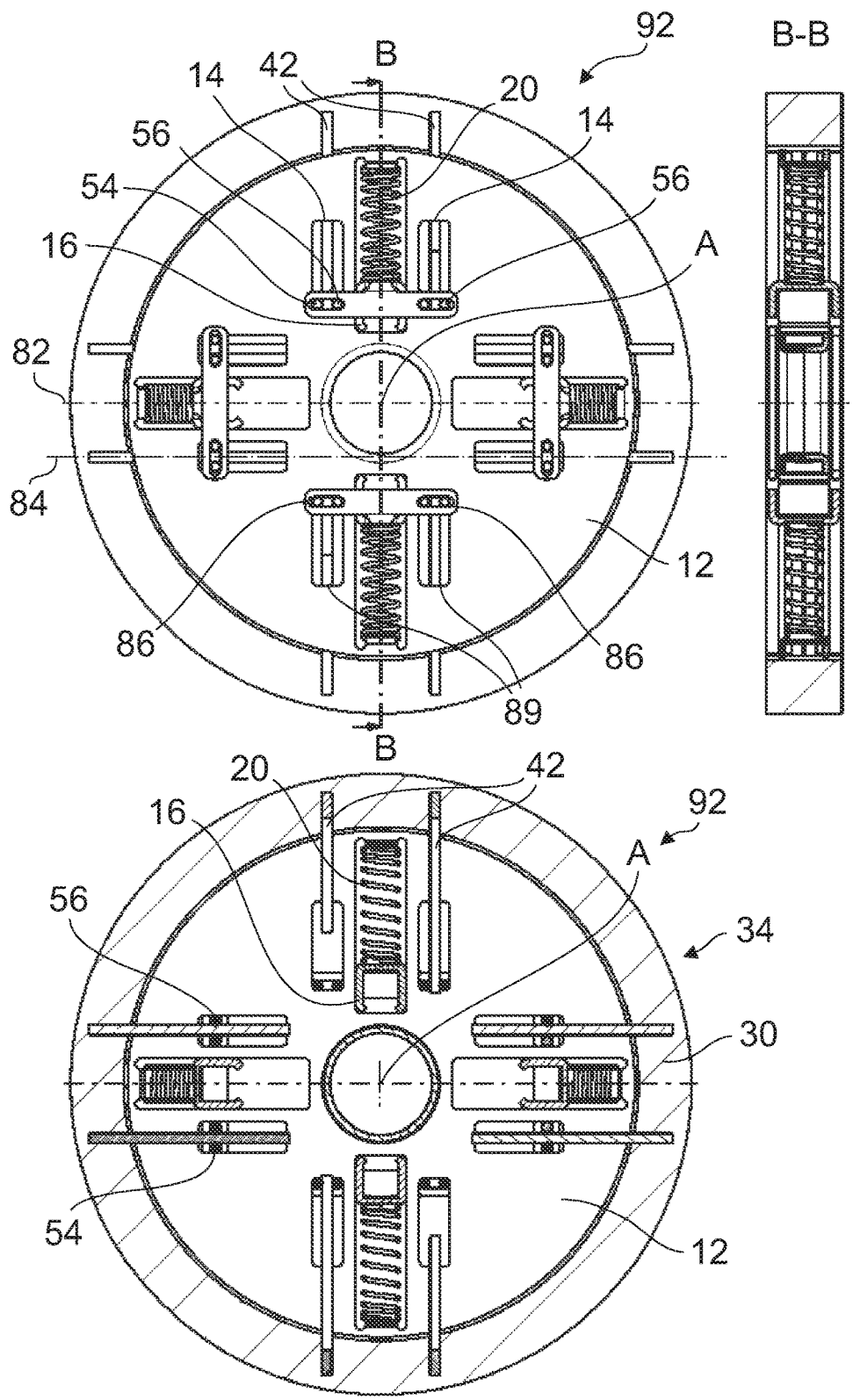
FIGS. 16a-16c are a torsional vibration damping arrangement in which the flyweights and sensor springs are shifted to regions that are not concentric to the flexible spring with parallel arrangement of the flexible springs for guiding the associated flyweight, at low speed and high speed combined.

FIG. 16 shows a further torsional vibration damping arrangement 92 which is actuated on both sides (with or without circumferential play in inactive position) which is constructed similar to torsional vibration damping arrangement 80 in FIGS. 12 and 13.

Although the main axes 82 of the preloading springs 20 and the main axes of the restoring elements 42 do not extend coaxially in this embodiment example either, this embodiment example is characterized in that a main axis 82 of a preloading spring 20 and a main axis 84 of a restoring element 42 corresponding to it extend substantially parallel to one another, i.e., basically form an angle of 0°. It is advantageous in this variant that the flyweight 16 and guides 86 thereof are simpler and more sparing of material. In contrast to torsional vibration damping arrangement 80, the guides 86 in this case need not permit movement of the contact pins 54, 56 in direction perpendicular to the main axis 82 of the preloading spring. In the parallel arrangement in FIG. 16, the flyweight 16 and contact pins 54, 56 under centrifugal force only move parallel to the main axis 82 of the preloading spring 20 and parallel to the main axis 84 of a restoring element 42 associated with the preloading spring 20.

As a result of the offset arrangement of the restoring elements or flexible springs 42 with respect to the axis of rotation A, a relative movement of a restoring element 42 in radial direction relative to the contact pin 54, 56 additionally takes place during deflection and can be transmitted via the contact pins 54, 56 to the respective flyweight 16. This relative movement can bring about tilting effects which can in turn lead to a certain hysteresis in the spring characteristic of the vibration absorber 92. The larger the offset of the main axes 84 of the restoring elements 42 to the axis of rotation A, the more pronounced this effect. Moreover, the embodiment form according to FIGS. 14 and 15 can also have this effect.

Figure 17:
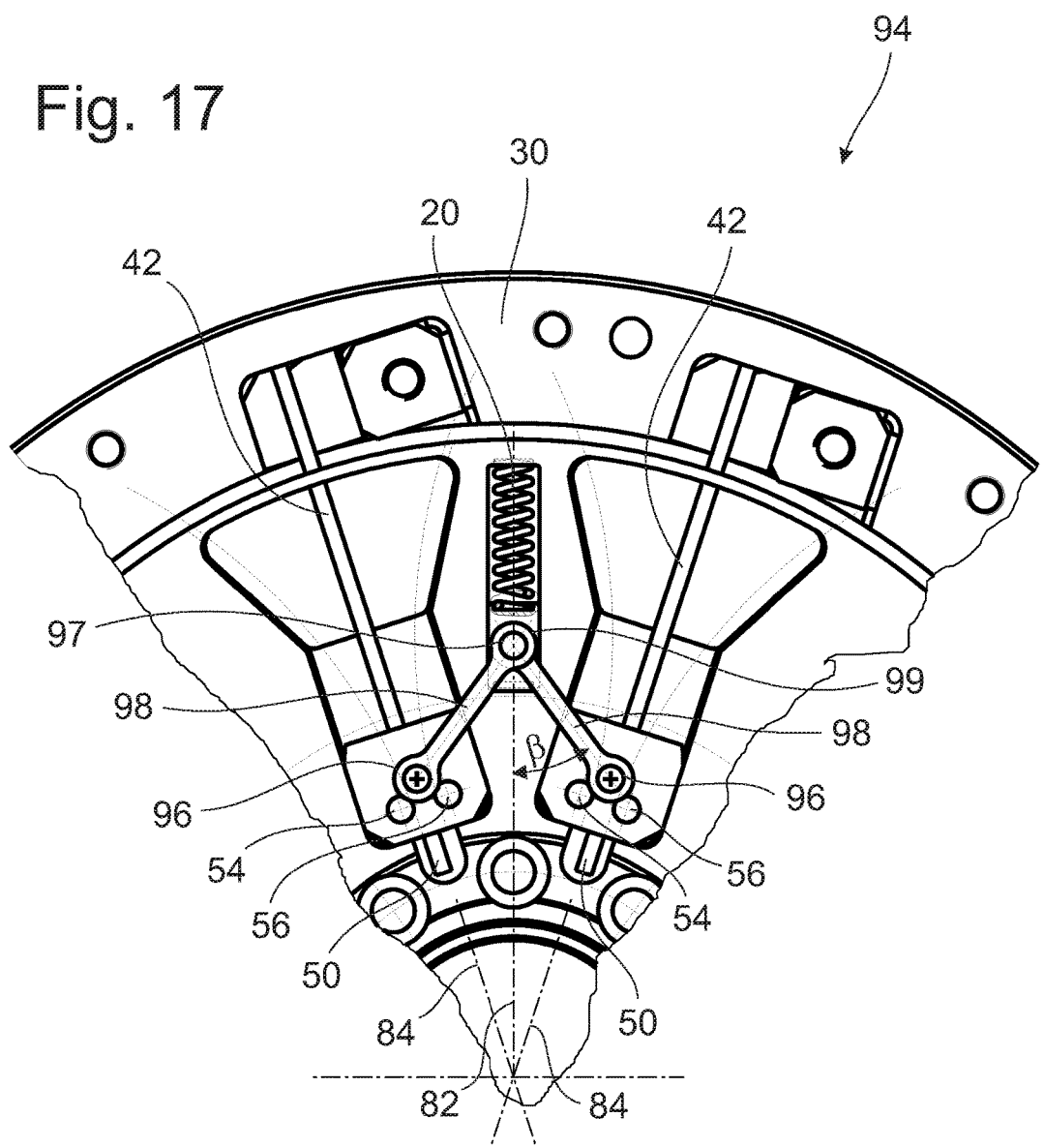
FIG. 17 is a torsional vibration damping arrangement with a sensor mass with jointed connection of the spring clamping, at low speed.
Figure 18:
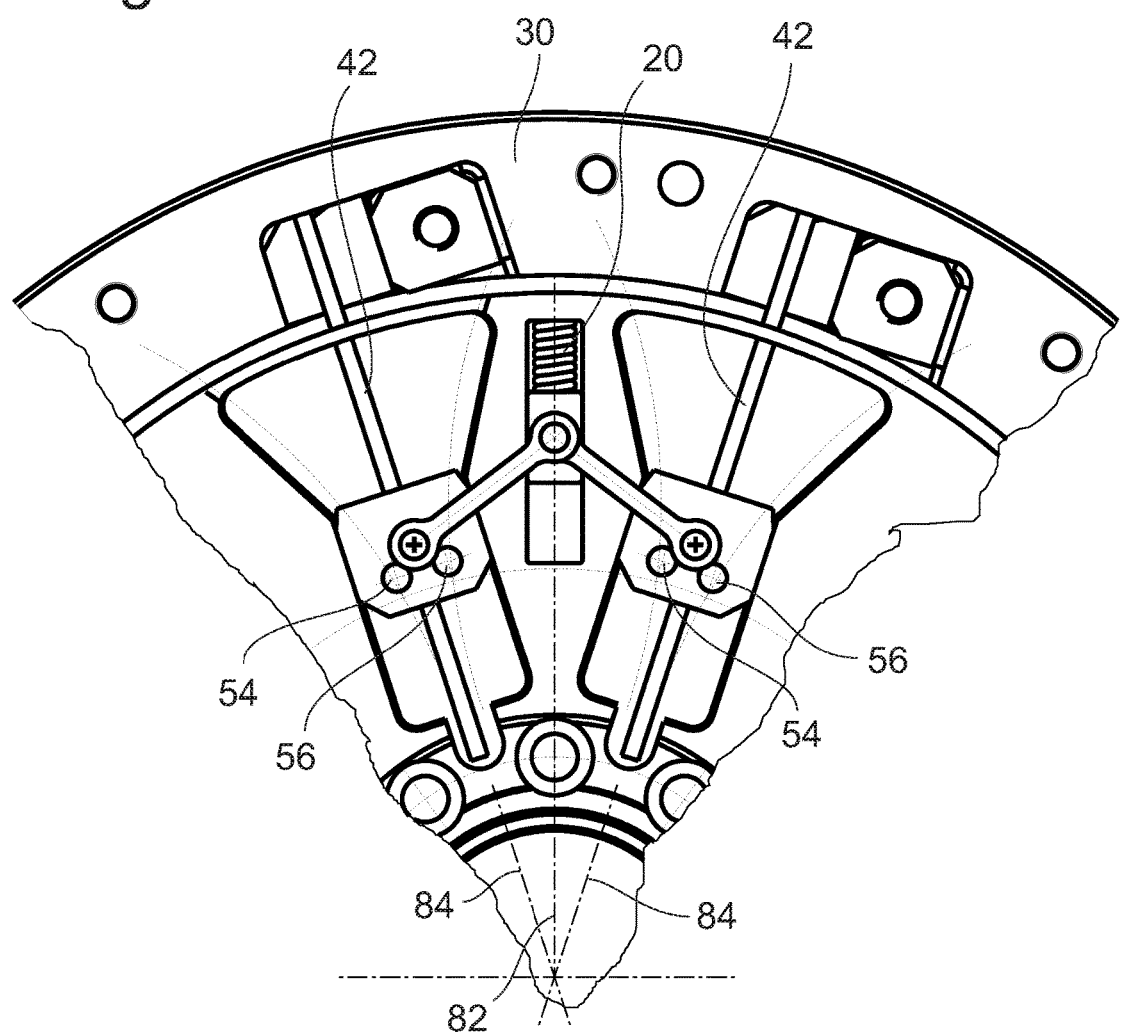
FIG. 18 is a sensor mass with jointed connection of the spring clamping, at high speed.

FIGS. 17 and 18 show an embodiment of a torsional vibration damping arrangement 94.

In the torsional vibration damping arrangement 94 shown in the enlarged view in FIGS. 17 and 18, a flyweight 16 which is guided along the main axis 84 of a restoring element 42 under centrifugal force and that comprises at least one force application point 54, 56 for the restoring element 42 is coupled with the preloading spring 20 via at least one joint 96. 97 such that an angle β between the main axis 82 of the preloading spring 20 and the flyweight 16 can be varied under centrifugal force. Angle β can be defined by the main axis 82 of the preloading spring 20 and a longitudinal axis of an oscillating support 98 which couples a sliding block or flyweight 16 with the preloading spring 20 or a sensor mass 99 connected to the latter.

As is shown in FIGS. 17 and 18, the preloading spring 20 can be coupled with two restoring elements 42 on the left-hand side and right-hand side of the latter via flyweights 16 or sliding blocks 16 which have force application points 54 and 56 for the restoring elements 42 in each instance. The sliding blocks 16 are in turn coupled with the preloading spring 20 via joints 96 and 97, respectively, located at the sliding blocks 16 and preloading springs. Joint 97 at the sensor spring 20 or preloading spring 20 is formed by two oscillating arms or oscillating supports 98, one of which leads from joint 97 to a joint 96 at the left-hand side or right-hand side flyweight 16. The angle 2β between the oscillating supports 98 changes as the speed varies or as the radial deflection of the flyweights 16 along the restoring elements 42 varies. While the amount of angle 2β is relatively small in the radial basic position (see FIG. 17) of the flyweights 16, the amount of the angle 2β between the oscillating supports 98 becomes increasingly greater (see FIG. 18) with radial deflection of the flyweights toward the outside.

According to one embodiment, a joint 96 of a flyweight 16 can be located, in the center of gravity of the flyweight 16 so that the sliding block or flyweight 16 cannot tilt or jam in its guide 14 when an actuating force is introduced. This makes possible a high degree of reliability. The oscillating support 98 can be connected to the joint 96 and, at its other end, to the sensor mass 99 of the sensor spring 20 by means of a joint 97. The sensor mass 99 is pressed radially inward by the sensor spring 20. Joint 97 is also preferably located in the center of gravity of the sensor mass 99 to prevent it from tilting.

With the arrangement according to FIGS. 17 and 18, which is axially symmetrical with respect to the main axis 82 of the sensor spring 20, two restoring elements 42 can be actuated by a speed sensor arrangement 20, 97, 98, 99 and a preloading spring 20. This allows a very large oscillating range of the vibration absorber mass 30 and vibration absorber springs as restoring elements 42.

The speed characteristic and, therefore, the absorber order can be tuned via the masses of the flyweights 16, the sensor mass 99, sensor spring 20 and the geometry of the oscillating supports 98.

FIG. 18 shows the torsional vibration damping arrangement 94 at high speed. In this torsional vibration damping arrangement 94, the sensor mass 99 is displaced radially outward against the preloading force of the sensor spring 20. The leaf springs 42 are therefore stiffer than in the setting shown in FIG. 17 because of the shorter bending length.

Depending on the tuning, a very light material can be chosen for the flyweights 16 such as friction-optimized plastic, because the function of the low-wear or wear-free engagement of leaf springs or restoring elements 42 is assumed via the inserted (steel) pins 56 and 54. The mass 99 is available as sensor mass. Due to the increasing stretching position of the oscillating supports 98 at high speed, the force of the sensor spring 20 acting on the flyweights 16 decreases so that an increase in stiffness of the restoring elements 42, which proceeds degressively over the increase in speed is also made possible. Accordingly, at high speed, a decreasing vibration absorber order can be generated, which can be advantageous, e.g., for protecting the vibration absorber. According to one embodiment, increases in stiffness of the restoring elements 42 which proceed progressively over the speed increase can certainly also be possible depending on the geometry of the speed sensor arrangement 20, 97, 98, 99.

Various possible uses of the torsional vibration damping arrangements described above will be discussed in the following referring to FIGS. 19 to 23.

Figure 19:
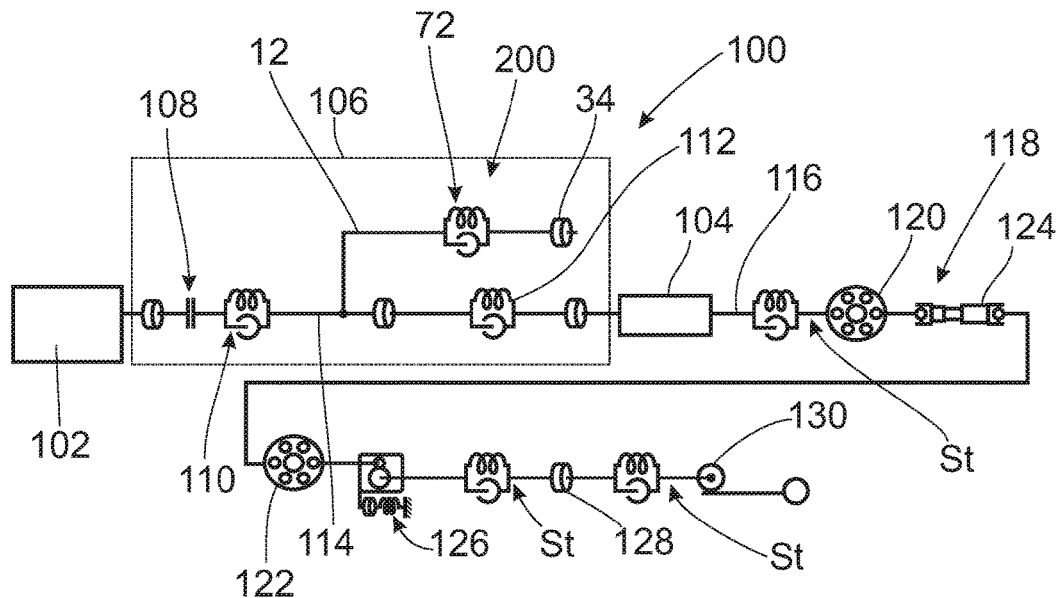
FIG. 19 is a schematic depiction of a drivetrain for a vehicle with a torsional vibration damping arrangement constructed according to the invention.

In FIG. 19, a drivetrain 100 comprises a drive unit 102 formed, for example, as an internal combustion engine. In the torque path between the drive unit 102 and a transmission 104, for example, an automatic transmission, a torsional vibration damping arrangement 200 according to one embodiment is arranged in a rotating wet space 106 of a starting element, designated generally by 108. This torsional vibration damping arrangement 200 has the stiffness provided by the deflection mass pendulum arrangements 72 with the deflection masses 34 and is coupled by carrier 12 to a rotating component of the drivetrain 100. Two torsional vibration dampers 110, 112 acting in series can be provided in the rotating wet space 106, each torsional vibration damper 110, 112 having a primary side and a secondary side and damper springs which are operative therebetween and via which the torque transmitted between the drive unit 102 and the transmission 104 is conducted. In the depicted embodiment example, a secondary side of torsional vibration damper 110 is coupled with a primary side of torsional vibration damper 112 to provide an intermediate mass or an intermediate element 114 to which the carrier 12 is connected. Downstream of the transmission 104 and transmission output shaft 116 in the torque path is a propeller shaft arrangement, designated generally by 118, with respective joint disks 120, 122 and a propeller shaft 124 located therebetween. On the output side, the propeller shaft 124 is coupled to an axle gear or differential 126. The torque is transmitted from the latter to rims 128 and tires 130. Respective stiffnesses are shown in association with various transmission shafts, e.g., the transmission output shaft 116 of a transmission shaft between the differential and the rims 128 or rims 128 and tires 130, based on the inherent elasticity thereof.

Figure 20:
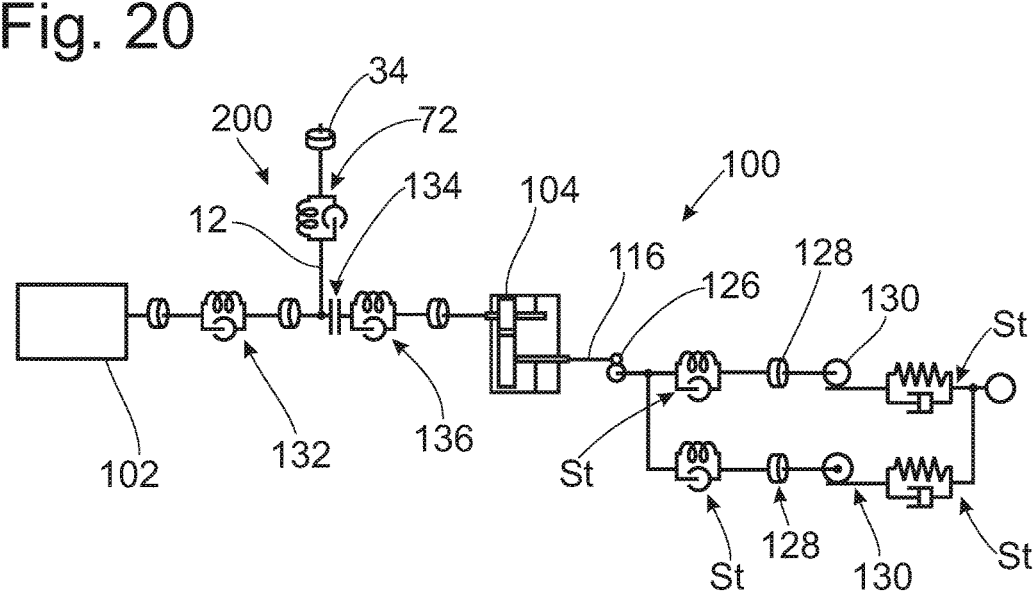
FIG. 20 is a view corresponding to FIG. 19 showing an alternative mode of construction.

While FIG. 19 shows a drivetrain 100 mounted longitudinally in driving direction, i.e., with longitudinally oriented drive unit 102 and longitudinally oriented transmission 104, FIG. 20 shows a drivetrain 100 with transversely mounted drive unit 102 and transmission 104. Located therebetween is a torsional vibration damper 132, for example, in the form of a dual mass flywheel, the secondary side thereof being coupled with a friction clutch, for example, a dry friction clutch 134. A clutch disk 136 which is likewise formed, for example, with a torsional vibration damper conveys the torque to the transmission 104 which is formed, for example, as a manual shift transmission. The carrier 12 of the torsional vibration damping arrangement 200 is coupled to the secondary side of the torsional vibration damper or dual mass flywheel 132. Downstream of the transmission output shaft 116 on the output side is a differential 126 and the drive axle with its two rims 128 and tires 130. Here again, respective stiffnesses of the drive shafts and wheels are illustrated by St.

Figure 21:
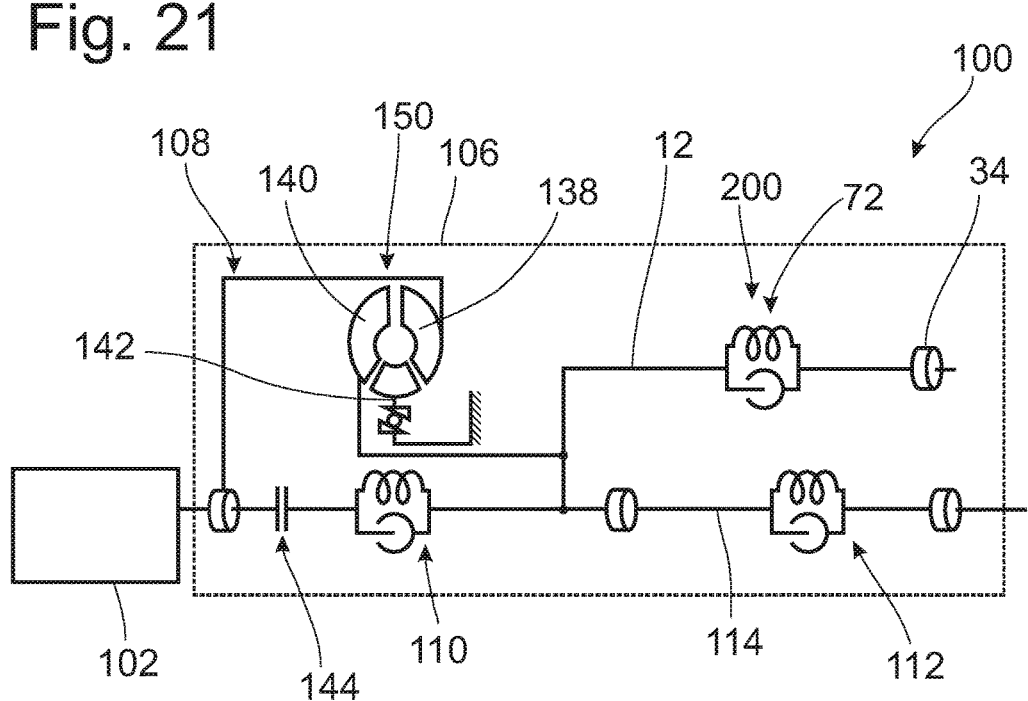
FIG. 21 is a view corresponding to FIG. 19 showing an alternative mode of construction.

FIG. 21 shows a further example of a portion of a drivetrain 100 with a hydrodynamic torque converter 150 as starting element 108 downstream of a drive unit 102. Provided in the housing or rotating wet space 106 thereof and rotating along with the latter is an impeller 138. A turbine 140 is provided axially opposed to the latter. A stator, designated generally by 142, is located between the impeller 138 and turbine 140. Parallel to the hydrodynamic torque transmission path which comprises the fluid circulation between the impeller, turbine and stator, a torque transmission path can be arranged via a lockup clutch 144. Downstream of the lockup clutch are the two torsional vibration dampers 110, 112, an intermediate mass 114 being formed therebetween. The turbine 140 and the carrier 12 of the torsional vibration damping arrangement 200 are coupled to this intermediate mass 114. It is noted here that the torsional vibration dampers which can also be seen, for example, in FIG. 21 can have a known construction with two cover disks and a central disk located therebetween. Either the two cover disks or the central disk is associated with the primary side, the other component then being associated with the secondary side. In each torsional vibration damper of this kind, one or more spring sets can operate in parallel or in series, possibly also in a stepped manner in order to achieve a correspondingly stepped damping characteristic.

Torsional vibrations or torsional irregularities transmitted into the input region of the hydrodynamic torque converter via the drive unit 102 can be reduced or damped initially in the torsional vibration damper 110 upstream in the torque path when the lockup clutch 144 is engaged or is transmitting torque. The torsional vibrations still being transmitted into the intermediate mass 114 can be further reduced or eliminated through the action of the torsional vibration damping arrangement 200 coupled therewith by corresponding configuration to an excitation order. A still further filtering or vibration damping can then be carried out through the further torsional vibration damper 112 downstream in the torque path.

It will be appreciated that different variations can be carried out in this respect. For example, the turbine 140 could be coupled directly to a transmission input shaft, i.e., the secondary side of the torsional vibration damper 112, which increases the mass inertia of a transmission input shaft. As a result, neither of the two torsional vibration dampers 110, 112 would be operative in the operative hydrodynamic range of the torque converter with lockup clutch 144 disengaged.

In a further variant, the turbine 140 could provide the deflection mass 34 or a part of the deflection mass 34. A merging of functions and, therefore, a compact constructional size can be ensured in this way. As a result of a configuration of this kind, the torsional vibration damping arrangement 200 is also utilized for torque transmission whenever the lockup clutch 144 is disengaged and a torque is to be transmitted via the turbine 140, and the configuration can then be such that the rotational angle limiting functionality of the bolts 40 and apertures 36 is operative in this condition, i.e., the restoring elements 42 are not loaded excessively. When the lockup clutch 144 is engaged, the turbine only operates as deflection mass 34 so that it also contributes to a viscous damping because of the fluidic interaction.

The lockup clutch 144 could also, of course, be located in the torque path between the two torsional vibration dampers 110, 112 or even downstream thereof, in which case it must be ensured that the turbine 140 is coupled to the lockup clutch 144 on the output side. Correspondingly, the carrier 12 of the torsional vibration damping arrangement 200 could also, of course, be coupled with the primary side of torsional vibration damper 110 or the secondary side of torsional vibration damper 112.

Figure 22:
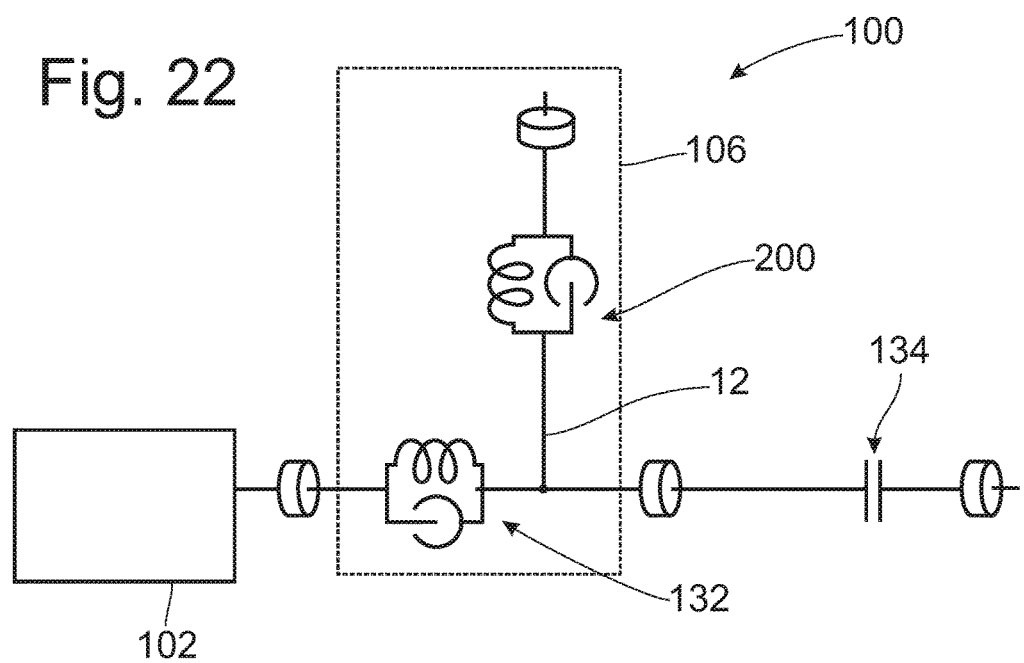
FIG. 22 is a view corresponding to FIG. 19 showing an alternative mode of construction.

FIG. 22 shows a constructional variant of a drivetrain 100 in which the drive unit 102 transmits its torque via a dual mass flywheel 132 integrated, for example, in a rotating wet space 106. The torsional vibration damping arrangement 200 is connected by the carrier 12 thereof on the secondary side of the dual mass flywheel 132. In this case, there is a downstream starting element, for example, a friction clutch 134, in the torque path.

Figure 23:
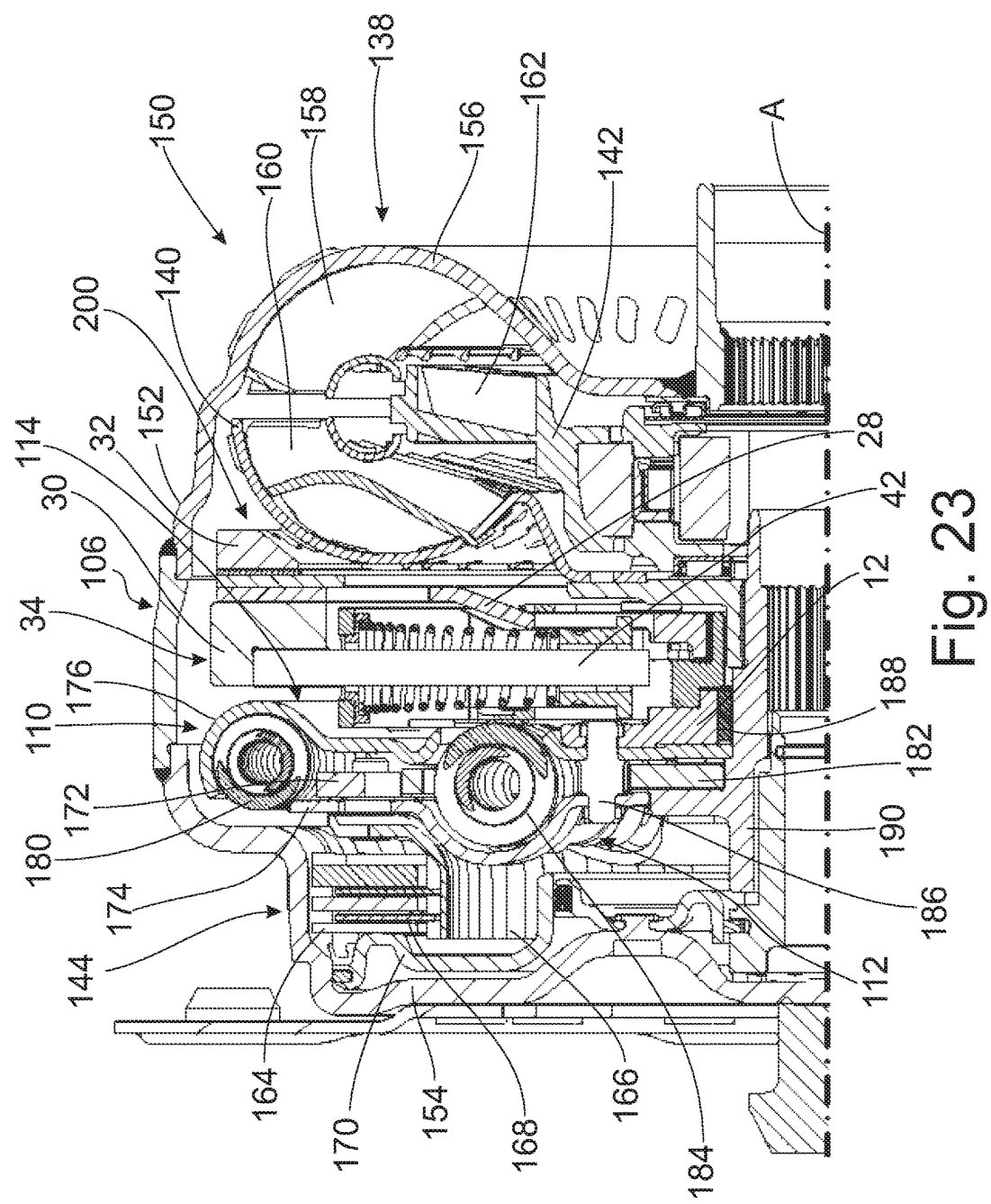
FIG. 23 is a fragmentary longitudinal section through a hydrodynamic torque converter with a torsional vibration damping arrangement constructed according to the invention integrated therein.

FIG. 23 shows a constructive layout of a hydrodynamic torque converter 150 in fragmentary longitudinal section. The housing 152 of the hydrodynamic torque converter 150 provides the rotating wet space 106 and comprises a drive-side housing shell 154 and an output-side housing shell 156 which also simultaneously forms an impeller shell and carries at its inner side a plurality of impeller blades 158 successively in circumferential direction around the axis of rotation A. The turbine 140 with turbine blades 160 is axially opposed to the impeller 138 provided in this way. The stator 142 with stator blades 162 is located between the impeller 138 and turbine 140.

The lockup clutch 144 comprises drive-side friction elements or plates 164 that are coupled to rotate with the drive-side housing shell 154 and output-side friction elements or plates 168 which are coupled to rotate with a friction element carrier 166. The latter can be pressed together by a clutch piston 170 for torque transmission and for engaging the lockup clutch 144. The torsional vibration damper 110 which is downstream of the lockup clutch 144 in the torque path and positioned here on the radially outer side comprises as primary side a central disk element 172 coupled with the friction element carrier 166. Located axially on both sides of the latter are cover disk elements 174, 176, the radially outer region of which essentially provides the secondary side of the torsional vibration damper 110. A torque is transmitted between the central disk element 172, i.e., the primary side, and the cover disk elements 174, 176, i.e., the secondary side, through damper springs 180 of the torsional vibration damper 110.

The radially inner areas of the cover disk elements 174, 176 form a secondary side of the second torsional vibration damper 112 which is positioned radially inwardly. A further central disk element 182 which essentially provides a secondary side of the further torsional vibration damper 112 is located axially between these cover disk elements which are fixedly connected to one another and is coupled with the cover disk elements 174, 176 through damper springs 184 for torque transmission.

The two cover disk elements 174, 176 also essentially provide the intermediate mass arrangement 114 to which the carrier 12 of a torsional vibration damping arrangement 200 constructed according to the invention is connected, for example, by means of bolts 186 which also fixedly connect the two cover disk elements 174, 176 to one another. The flywheel mass 34 of the torsional vibration damping arrangement 200 comprises the two mass rings 30, 32 and the carrier disk 28 and is located axially substantially between the two radially staggered torsional vibration dampers 110, 112 and the turbine 140. Owing to the shape of the mass ring 32 with radially inwardly angled contour, this mass ring 32 can be positioned so as to axially overlap the turbine 140, which allows an axially compact constructional size. According to one embodiment, the vibration absorber arrangement 200 can be coupled to the secondary side of at least one of the torque-transmitting rotational or torsional vibration dampers 110, 112. Accordingly, broadly speaking, the speed-adaptive vibration damper 200 is an additional mass that can be coupled to the drive system or at least one of the torsional vibration dampers 110, 112 via a variable spring system. With respect to the connection of the torsional vibration damping arrangement 200, shown in FIG. 23, to the secondary side of a rotational or torsional vibration damper 110, 112, for example, inside a torque converter or a dual mass flywheel (not shown), the torsional vibration damping arrangement 200 can be constructed so as to be comparatively light because the residual excitation at the site of the connection of the torsional vibration damping arrangement 200 behind the series-connected damper springs 180 and 184 can be comparatively small.

The carrier 12 is rotatably mounted on the radially inner side via a bearing 188, for example, a friction bearing or rolling element bearing, on an output hub 190 of the torsional vibration damping arrangement 200 connected to the central disk 182. The turbine 140 is also connected to this output hub 190, for example, by a toothed engagement, so as to rotate together with it such that the torque transmitted via the turbine is transmitted into the output hub 190 while circumventing the two torsional vibration dampers 110, 112 operating in series. Alternatively, as has already been stated, the turbine 140 can be coupled to the carrier 12 or, generally, the intermediate mass 114 or to the deflection mass 34 in order to increase the mass inertia thereof.

The features disclosed in the preceding description, appended claims and drawings can be significant individually as well as in any combination for implementing an embodiment example in its various refinements.

While some aspects have been described in connection with an apparatus, it will be appreciated that these aspects also represent a description of a corresponding method so that a module or a component of an apparatus is also to be comprehended as a corresponding method step or as a feature of a method step. Similarly, aspects which have been described in connection with, or as, a method step also represent a description of a corresponding module or detail or feature of a corresponding apparatus.

The embodiment examples described above merely represent an illustration of the principles of the present invention. It will be appreciated that modifications and variations of the arrangements and details described herein will be clear to other skilled persons. Therefore, it is intended that the invention be limited only by the protective scope of the appended patent claims and not by the specific details which were presented herein with reference to the description and explanation of the embodiment examples.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement for a drivetrain of a vehicle, comprising:
a carrier arrangement that rotates around an axis of rotation (A);
a plurality of flexible restoring elements, wherein each restoring element comprises a restoring spring, configured as one of a leaf spring and a bar spring, with a linear force characteristic curve (K3);
a deflection mass that moves in a circumferential direction relative to the carrier arrangement, wherein the carrier arrangement and the deflection mass are coupled so as to rotate relative to one another via the plurality of flexible restoring elements arranged in circumferential direction and extend from the deflection mass in direction of the carrier arrangement,
wherein each restoring element deforms around a respective force application point movable in a radial direction under centrifugal force and which is associated with the restoring element,
a preloading spring provides a preloading force acting radially in a direction of the axis of rotation (A) on the respective force application point,
wherein a longitudinal main axis of the preloading spring and a longitudinal main axis of the restoring element do not extend coaxially so that the restoring element is located outside of the preloading spring.

2. The torsional vibration damping arrangement according to claim 1, wherein the restoring element is arranged outside of its associated preloading spring in circumferential direction.

3. The torsional vibration damping arrangement according to claim 1, wherein the main axis of each preloading spring and the main axis of the respective restoring element extend obliquely with respect to one another in radial direction.

4. The torsional vibration damping arrangement according to claim 1, wherein the main axis of the preloading spring and the main axis of the restoring element extend parallel to one another.

5. The torsional vibration damping arrangement according to claim 1, wherein the respective movable force application point which is associated with the restoring element is guided through a flyweight which moves in radial direction, wherein the flyweight is acted upon by the preloading force acting radially inward by the preloading spring.

6. The torsional vibration damping arrangement according to claim 5, wherein a relative position between the force application point and the flyweight is variable under centrifugal force.

7. The torsional vibration damping arrangement according to claim 6, wherein the torsional vibration damping arrangement guides the force application point by the flyweight under centrifugal force in a guide perpendicular to the main axis of a respective associated restoring element such that at a first speed of the torsional vibration damping arrangement the force application point is positioned closer to the flyweight or preloading spring than at a second speed that is greater than the first speed.

8. The torsional vibration damping arrangement according to claim 1, wherein the movable force application point is provided by a contact pin for the restoring element, the contact pin is movable along the main axis of a respective associated restoring element.

9. The torsional vibration damping arrangement according to claim 1, wherein the plurality of restoring elements are associated with the preloading spring, the plurality of restoring elements do not extend coaxial to the preloading spring, such that the movable force application point of an associated restoring elements are moved together with one another in radial direction under centrifugal force by the preloading spring.

10. The torsional vibration damping arrangement according to claim 9, wherein restoring elements associated with the preloading spring are arranged in circumferential direction outside of the preloading spring and on both sides thereof.

11. The torsional vibration damping arrangement according to claim 1, wherein a flyweight which is guided along the main axis of the restoring element under centrifugal force and which comprises at least one force application point for the restoring element is coupled with the preloading spring by at least one joint such that an dry friction clutch angle between the main axis of the preloading spring and flyweight can be varied.

12. The torsional vibration damping arrangement according to claim 1, wherein a first restoring element that cooperates with the preloading spring is preloaded in a first direction in an inactive position of the torsional vibration damping arrangement, and in that a second restoring element that cooperates with the preloading spring is preloaded in a second direction opposite to the first direction in the inactive position.

13. The torsional vibration damping arrangement according to claim 12, wherein the opposed preloading forces resulting from the opposed preloading are identical in amount in the inactive position.

14. The torsional vibration damping arrangement according to claim 13, wherein the first restoring element in the inactive position of the torsional vibration damping arrangement is preloaded in the first direction through direct contact with respective force application point associated with the first restoring element, and in that the second restoring element in the inactive position is preloaded in the second direction through direct contact with the force application point associated with the second restoring element.

15. The torsional vibration damping arrangement according to claim 14, wherein only one force application point that moves in radial direction is associated with each restoring element, wherein the respective force application points of the first restoring element and second restoring element are arranged on different sides of the restoring elements to achieve the opposed preloading forces.

16. The torsional vibration damping arrangement according to claim 14, wherein two force application points, which move in radial direction, are associated with reach restoring element, wherein the two force application points move radially opposite to one another on different sides of the respective restoring element under centrifugal force, and wherein the two force application points are arranged asymmetrically with respect to the respective restoring element in the inactive position to achieve the opposed preloading.

17. The torsional vibration damping arrangement according to claim 16, wherein the first restoring element and the second restoring element form a pair of restoring elements arranged directly adjacent to one another in circumferential direction, and wherein the torsional vibration damping arrangement has a plurality of pairs arranged in circumferential direction.

18. The torsional vibration damping arrangement according to claim 1, wherein the restoring element is fixed with respect to the deflection mass and/or with respect to the carrier arrangement.

19. A drivetrain for a vehicle, comprising:
at least one torsional vibration damping arrangement having:
a carrier arrangement that rotates around an axis of rotation (A);
a plurality of flexible restoring elements, wherein each restoring element comprises a restoring spring, configured as one of a leaf spring and a bar spring, with a linear force characteristic curve (K3);
a deflection mass that moves in a circumferential direction relative to the carrier arrangement, wherein the carrier arrangement and the deflection mass are coupled so as to rotate relative to one another via the plurality of flexible restoring elements arranged in circumferential direction and extend from the deflection mass in direction of the carrier arrangement,
wherein each restoring element deforms around a respective force application point movable in a radial direction under centrifugal force and which is associated with the restoring element,
a preloading spring provides a preloading force acting radially in a direction of the axis of rotation (A) on the respective force application point,
wherein a longitudinal main axis of the preloading spring and a longitudinal main axis of the restoring element do not extend coaxially so that the restoring element is located outside of the preloading spring.

20. The drivetrain according to claim 19, wherein the drivetrain has:
a starting element,
one of a hydrodynamic torque converter, fluid clutch, wet friction clutch, and a dry friction clutch,
wherein the at least one torsional vibration damping arrangement is provided in a region of the starting element.

21. The drivetrain according to claim 20, wherein the drivetrain comprises at least one torsional vibration damper with a primary side and a secondary side rotatable with respect to the primary side against a restoring action of a spring arrangement, wherein the carrier arrangement of the at least one torsional vibration damping arrangement is connected to the primary side or secondary side of the at least one torsional vibration damper so as to be fixed with respect to rotation relative to it.

22. The drivetrain according to claim 21, wherein the at least one torsional vibration damper has a first spring arrangement and a second spring arrangement, wherein an intermediate element is rotatable with respect to the primary side against the restoring action of the first spring arrangement and the secondary side is rotatable with respect to the intermediate element against the restoring action of the second spring arrangement.

23. The drivetrain according to claim 22, wherein the carrier arrangement of the at least one torsional vibration damping arrangement is connected to the intermediate element of the at least one torsional vibration damper so as to be fixed with respect to rotation relative to it.

* * * * *